US011976646B2

(12) United States Patent
Cheng et al.

(10) Patent No.: US 11,976,646 B2
(45) Date of Patent: May 7, 2024

(54) MICROFLUIDIC CHIP PUMPS AND METHODS THEREOF

(71) Applicant: HEALTELL (GUANGZHOU) MEDICAL TECHNOLOGY CO., LTD., Shanghai (CN)

(72) Inventors: Xin Cheng, Shanghai (CN); Hanguang Zhao, Shanghai (CN); Youwei Jiang, Shanghai (CN); Bob Xu, Shanghai (CN); Yu Liu, Shanghai (CN); Rifei Chen, Shanghai (CN)

(73) Assignee: HEALTELL (GUANGZHOU) MEDICAL TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 17/659,329

(22) Filed: Apr. 14, 2022

(65) Prior Publication Data

US 2022/0235753 A1 Jul. 28, 2022

Related U.S. Application Data

(63) Continuation of application No. PCT/CN2019/111841, filed on Oct. 18, 2019.

(51) Int. Cl.
*F04B 43/02* (2006.01)
*B01L 3/00* (2006.01)

(52) U.S. Cl.
CPC ........ *F04B 43/028* (2013.01); *B01L 3/50273* (2013.01); *B01L 2300/123* (2013.01); (Continued)

(58) Field of Classification Search
None
See application file for complete search history.

(56) References Cited

U.S. PATENT DOCUMENTS 3,779,384 A * 12/1973 Stahlkopf ............. F04B 43/067 210/136
4,624,625 A * 11/1986 Schrenker ............... F04B 49/20 417/317

(Continued)

FOREIGN PATENT DOCUMENTS

CN 1462834 A 12/2003
CN 102192135 A 9/2011

(Continued)

OTHER PUBLICATIONS

Notice of Review Opinion in TW Application No. 109133576 dated Sep. 7, 2021, 28 pages.

(Continued)

*Primary Examiner* — Brian R Gordon
(74) *Attorney, Agent, or Firm* — METIS IP LLC

(57) ABSTRACT

A microfluidic chip pump is provided. The microfluidic chip pump may include: a pump housing comprising a pump cavity, a moveable member arranged in the pump cavity, separating the pump cavity into a first chamber and a second chamber; and an actuator assembly configured to drive the moveable member between a first stable position and a second stable position, changing a volume of the first chamber and a volume of the second chamber. When the moveable member is at the first stable position, the first chamber may reach a minimum volume. When the moveable member is at the second stable position, the first chamber may reach a maximum volume. The microfluidic chip pump may be configured to expel a fixed volume of fluid from the second chamber each time the moveable member is driven from the first stable position to the second stable position.

10 Claims, 6 Drawing Sheets

300

300

(52) U.S. Cl.
CPC . *B01L 2400/043* (2013.01); *B01L 2400/0439* (2013.01); *B01L 2400/0666* (2013.01)

(56) References Cited

U.S. PATENT DOCUMENTS

| | | | | | |
|---|---|---|---|---|---|
| 4,634,430 | A * | 1/1987 | Polaschegg | A61M 60/427 604/141 |
| 5,178,182 | A * | 1/1993 | Kamen | A61M 5/365 137/454.2 |
| 5,520,523 | A * | 5/1996 | Yorita | F04B 43/067 417/387 |
| 5,725,363 | A * | 3/1998 | Bustgens | F04B 43/043 417/413.1 |
| 5,759,014 | A * | 6/1998 | Van Lintel | F04B 43/046 417/413.2 |
| 5,921,951 | A * | 7/1999 | Morris | A61M 60/438 604/6.11 |
| 6,109,881 | A * | 8/2000 | Snodgrass | F04B 43/0081 417/387 |
| 6,283,944 | B1 | 9/2001 | McMullen et al. | |
| 6,343,614 | B1 * | 2/2002 | Gray | F04B 43/0081 417/63 |
| 6,390,791 | B1 * | 5/2002 | Maillefer | F04B 43/043 251/129.01 |
| 6,604,908 | B1 * | 8/2003 | Bryant | F04B 49/24 417/27 |
| 6,948,918 | B2 | 9/2005 | Hansen | |
| 7,284,966 | B2 * | 10/2007 | Xu | F04B 53/106 417/413.2 |
| 9,895,692 | B2 * | 2/2018 | Battrell | B01L 3/50273 |
| 10,578,098 | B2 * | 3/2020 | Orr | A61M 1/14 |
| 2004/0013536 | A1 | 1/2004 | Hower et al. | |
| 2004/0115068 | A1 * | 6/2004 | Hansen | F04B 19/24 417/379 |
| 2004/0265150 | A1 * | 12/2004 | McElfresh | B81B 3/0035 251/129.01 |
| 2005/0069425 | A1 * | 3/2005 | Gray | F04B 49/065 417/390 |
| 2005/0074340 | A1 | 4/2005 | Xu et al. | |
| 2005/0092662 | A1 | 5/2005 | Gilbert et al. | |
| 2005/0207912 | A1 * | 9/2005 | Lolli | F04B 43/067 417/471 |
| 2006/0051214 | A1 | 3/2006 | Ussing | |
| 2007/0234785 | A1 * | 10/2007 | Beerling | F16K 99/0059 137/561 R |
| 2009/0060750 | A1 * | 3/2009 | Chen | F04B 43/043 417/26 |
| 2009/0185955 | A1 | 7/2009 | Nellissen | |
| 2011/0070110 | A1 * | 3/2011 | Hirata | F04B 43/043 417/413.2 |
| 2011/0240672 | A1 | 10/2011 | Nagasaki et al. | |
| 2012/0024389 | A1 * | 2/2012 | Renna | F04B 43/043 29/605 |
| 2013/0032210 | A1 | 2/2013 | Johnstone et al. | |
| 2014/0037481 | A1 * | 2/2014 | Stephane | F04B 43/043 417/480 |
| 2014/0044568 | A1 | 2/2014 | Fouillet et al. | |
| 2015/0025461 | A1 | 1/2015 | Corso et al. | |
| 2015/0258273 | A1 | 9/2015 | Payne et al. | |
| 2015/0352549 | A1 | 12/2015 | Kolb et al. | |
| 2017/0151560 | A1 | 6/2017 | Zhou et al. | |
| 2017/0218943 | A1 * | 8/2017 | Ellis | F04B 51/00 |
| 2018/0345288 | A1 | 12/2018 | Belotserkovsky et al. | |
| 2019/0383282 | A1 * | 12/2019 | Peters | F04B 43/0081 |
| 2020/0102948 | A1 * | 4/2020 | Matsuo | H01L 21/67017 |
| 2020/0384189 | A1 * | 12/2020 | Lark | A61M 5/14593 |

FOREIGN PATENT DOCUMENTS

| | | | |
|---|---|---|---|
| CN | 103282706 | A | 9/2013 |
| CN | 103454439 | A | 12/2013 |
| CN | 103599578 | A | 2/2014 |
| CN | 103939317 | A | 7/2014 |
| CN | 204337415 | U | 5/2015 |
| CN | 109026653 | A | 12/2018 |
| CN | 109351367 | A | 2/2019 |
| CN | 110180612 | A | 8/2019 |
| EP | 1403519 | A1 | 3/2004 |
| JP | H03217672 | A | 9/1991 |
| JP | 2003083256 | A | 3/2003 |
| JP | 2003139660 | A | 5/2003 |
| KR | 20090088085 | A | 8/2009 |
| WO | 2005031163 | A1 | 4/2005 |
| WO | 2005031165 | A1 | 4/2005 |

OTHER PUBLICATIONS

Notice of Allowance in TW Application No. 109133576 dated Mar. 4, 2022, 3 pages.

Ni, Junhui, Research and Application on Planar PMDS Microvalve and Micropump for Microfluidic System, Chinese Doctor Dissertations Full-text Database Engineering Science and Techology, 2011, 109 pages.

The Extended European Search Report in European Application No. 19949243.0 dated Sep. 5, 2022, 9 pages.

Notice of Reasons for Rejection in Japanese Application No. 2022-523278 dated May 29, 2023, 12 pages.

* cited by examiner

MICROFLUIDIC CHIP PUMPS AND METHODS THEREOF

CROSS-REFERENCE TO RELATED APPLICATIONS

This application is a Continuation of International Application No. PCT/CN2019/111841 filed on Oct. 18, 2019, the contents of which are hereby incorporated by reference.

TECHNICAL FIELD

This disclosure generally relates to fluid dispensing technique, and more particularly, relates to systems and methods for dispensing a fluid using a microfluidic chip pump.

BACKGROUND

Pumps are widely used in fluid dispensing. Traditional dispensing technique of a fluid is mainly based on analog output. This requires the use of sophisticated sensors (e.g., flow sensors, displacement sensors, or the like) to detect an actual status of the fluid and dynamical adjustment of the dispensing volume for a single time to achieve an overall dispensing accuracy, which is costly and can increase the complexity of the dispensing system. Furthermore, the feedback of the actual status of the fluid to the dispensing system is time consuming, and thus this approach takes times to achieve stable dispensing. Hence, when using the traditional dispensing technique, it is difficult to achieve accurate and stable dispensing, especially when a relatively small volume of fluid needs to be dispensed each time. Therefore, it is desirable to provide systems and methods for using a microfluidic chip pump to dispense the fluid conveniently, accurately and with low cost.

SUMMARY

In one aspect of the present disclosure, a microfluidic chip pump is provided. The microfluidic chip pump may include a pump housing comprising a pump cavity, a moveable member arranged in the pump cavity, separating the pump cavity into a first chamber and a second chamber; and an actuator assembly configured to drive the moveable member between a first stable position and a second stable position, changing a volume of the first chamber and a volume of the second chamber. When the moveable member is at the first stable position, the first chamber may reach a minimum volume. When the moveable member is at the second stable position, the first chamber may reach a maximum volume. The microfluidic chip pump may be configured to expel a fixed volume of fluid from the second chamber each time the moveable member is driven from the first stable position to the second stable position. The fixed volume may equal to a difference between the maximum volume of the first chamber and the minimum volume of the first chamber.

In another aspect of the present disclosure, a method for dispensing a fixed volume of a fluid using a microfluidic chip pump, which includes a pump housing comprising a pump cavity, a moveable member separating the pump cavity into a first chamber and a second chamber, and an actuator assembly, is provided. The method may include one or more of the following operations: driving the moveable member, by the actuator assembly, to a first stable position, causing the fluid to flow into the second chamber through an inlet valve and causing the first chamber to reach a minimum volume, while an outlet valve is closed; and driving the moveable member, by the actuator assembly, from the first stable position to a second stable position, causing the fluid to flow out of the second chamber through the outlet valve and causing the first chamber to reach a maximum volume, while the inlet valve is closed. The fixed volume may equal to a difference between the maximum volume and the minimum volume of the first chamber.

In another aspect of the present disclosure, a method for dispensing a target volume of a fluid by dispensing a fixed volume of the fluid one or more times using a microfluidic chip pump, which includes a pump housing comprising a pump cavity, a moveable member separating the pump cavity into a first chamber and a second chamber, and an actuator assembly, is provided. The method may include one or more of the following operations: determining a count of first control signals and second control signals based on the target volume and the fixed volume, and sending first control signals and second control signals to dispense the fixed volume of the fluid until reaching the target volume. For each time of dispensing the fixed volume, the method may include: sending a first control signal to the actuator assembly to drive the moveable member to a first stable position, causing the fluid to flow into the second chamber through an inlet valve and causing the first chamber to reach a minimum volume, while an outlet valve is closed; and sending a second control signal to the actuator assembly to drive the moveable member from the first stable position to a second stable position, causing the fluid to flow out of the second chamber through the outlet valve and causing the first chamber to reach a maximum volume, while the inlet valve is closed. The fixed volume may equal to a difference between the maximum volume and the minimum volume of the first chamber.

In some embodiments, the pump housing may include a first wall, which is positioned to confine the moveable member into the first stable position. In some embodiments, the moveable member may abut the first wall when in the first stable position.

In some embodiments, the pump housing may include a second wall, which is positioned to confine the moveable member into the second stable position. In some embodiments, the moveable member may abut the second wall when in the second stable position.

In some embodiments, the fixed volume of fluid expelled from the second chamber may be in the range of 0.01 μL-10 mL.

In some embodiments, the fixed volume of fluid expelled from the second chamber may be in the range of 0.1 μL-2 μL.

In some embodiments, the fixed volume of fluid expelled from the second chamber may be 0.5 μL.

In some embodiments, the fluid may be an insulin solution.

In some embodiments, the microfluidic chip pump may further include: an inlet valve in fluid communication with the second chamber; and an outlet valve in fluid communication with the second chamber.

In some embodiments, the microfluidic chip pump may further include: a fluid reservoir in fluid communication with the inlet valve through a first channel; and an application member in fluid communication with the outlet valve through a second channel.

In some embodiments, the microfluidic chip pump may further include: a control circuitry configured to provide control signals to the actuator assembly to drive the moveable member between the first stable position and the second stable position.

In some embodiments, the control signals include: a first control signal to the actuator assembly to drive the moveable member from the second stable position to the first stable position, and a second control signal to the actuator assembly to drive the moveable member from the first stable position to the second stable position. In some embodiments, the first control signal and the second control signal may be represented by pulse signals.

In some embodiments, the moveable member may be made of an elastic material.

In some embodiments, the moveable member may be a deformable membrane.

In some embodiments, the moveable member may be made of a rigid material.

In some embodiments, the moveable member may be a moveable piston.

In some embodiments, the moveable member may be a magnetic force driving member.

In some embodiments, the actuator assembly may include an actuation component and a transmission component.

In some embodiments, the actuation component may include at least one of: a motor, a piezoelectric actuator, a magnetic actuator, a metal memory component, or a thermal deformation-related component.

In some embodiments, the transmission component may include at least one of: a hydraulic transmission device, a pneumatic transmission device, or a mechanical transmission device.

In some embodiments, the microfluidic chip pump may be operably coupled to or include one or more sensors configured to monitor a working status of the microfluidic chip pump.

In some embodiments, the determining a count of first control signals and second control signals based on the target volume and the fixed volume may include: determining a frequency of using the microfluidic chip to dispense the fluid based on a predetermined volume in a unit time or a predetermined time period, and the fixed volume; and determining the count of first control signals and second control signals based on the frequency.

In some embodiments, the method may further include adjusting the target volume by adjusting the frequency.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
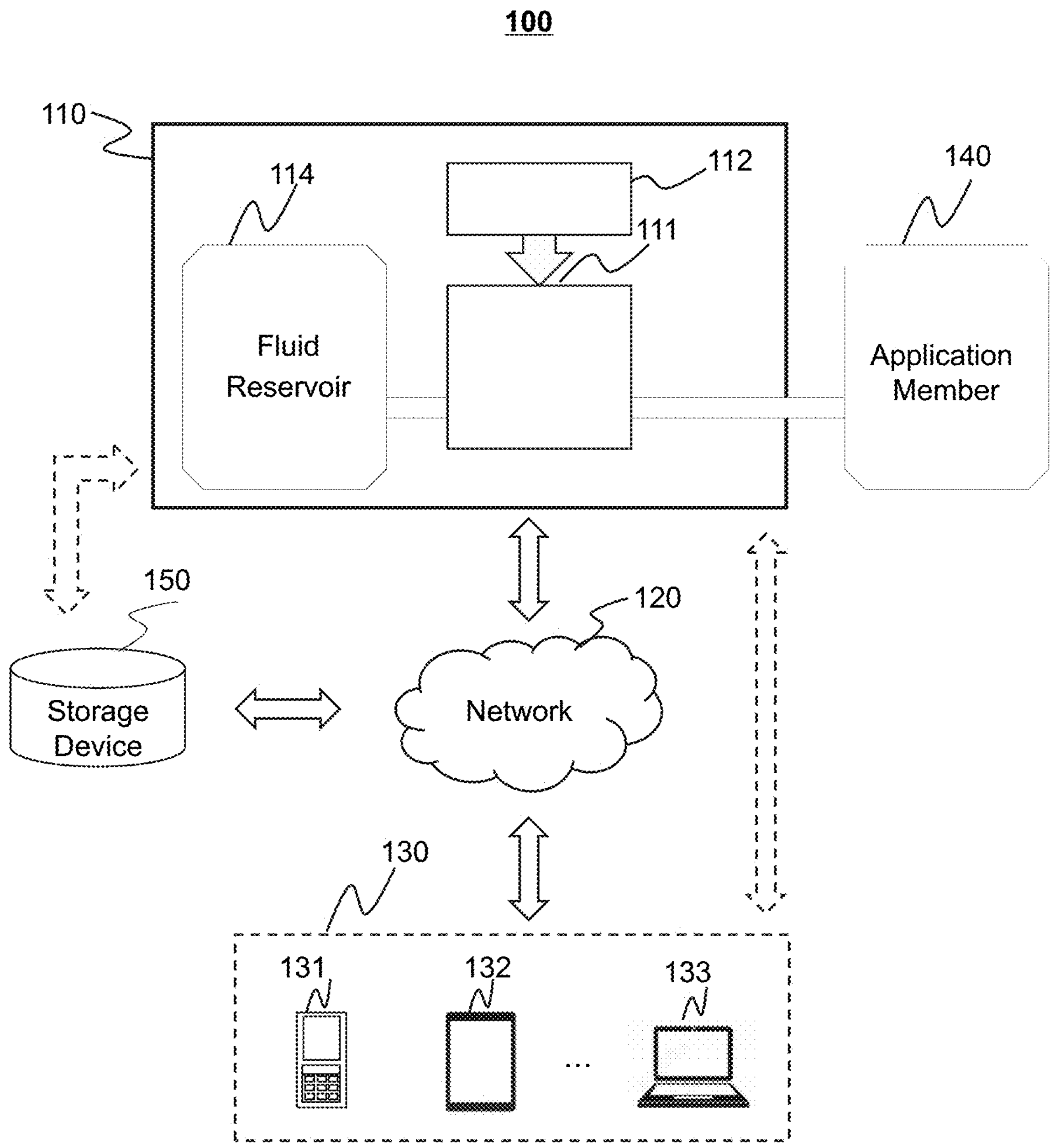
FIG. 1 is a schematic diagram illustrating an exemplary application scenario of a dispensing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Also, the term "exemplary" is intended to refer to an example or illustration.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

Spatial and functional relationships between elements are described using various terms, including "connected," "attached," and "mounted." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, attached, or positioned to another element, there are no intervening elements present. Other words used to describe the relationship between elements should be interpreted in a like fashion (e.g., "between," versus "directly between," "adjacent," versus "directly adjacent," etc.).

It should also be understood that terms such as "top," "bottom," "upper," "lower," "vertical," "lateral," "above," "below," "upward(s)," "downward(s)," "left-hand side" "right-hand side" "horizontal," and other such spatial reference terms are used in a relative sense to describe the positions or orientations of certain surfaces/parts/components of a pump with respect to other such features of the pump when the pump is in a normal operating position and may change if the position or orientation of the pump changes.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

The present disclosure relates to systems and methods for using a microfluidic chip pump to dispense a fluid. The microfluidic chip pump may include a pump housing comprising a pump cavity, a moveable member separating the pump cavity into a first chamber and a second chamber, and an actuator assembly. A target volume of a fluid may be dispensed by dispensing a fixed volume of the fluid one or more times using the microfluidic chip pump. Specifically, a count of first control signals and second control signals may be determined based on the target volume and the fixed volume, the first control signals and second control signals may be sent to the actuator assembly to cause the fixed volume of the fluid to be dispensed until the target volume is reached.

According to the microfluidic chip pump of the present disclosure, a traditional continuous (or analog) dispensing of the fluid can be realized by a discrete (or digital) dispensing of the fluid. The microfluidic chip pump can pump out a unit volume of fluid each time, and the unit volume can be fixed. By adjusting the frequency of using the microfluidic chip pump to dispense the fluid (i.e., the dispensing times of the microfluidic chip pump in a unit time), the dispensing of a desired volume of fluid can be achieved. Therefore, the accuracy of the dispensing of the fluid can be increased by increasing the accuracy of the unit volume, and the accuracy of the unit volume may be guaranteed because of the configuration of the stable position(s) of the moveable member of the microfluidic chip pump. Besides, no feedback of the actual status of the fluid is needed, and thus the dispensing system can be simplified, the cost can be lowered, the stable dispensing can be achieved quickly, and the accurate dispensing for a relatively long time (or each time) can be guaranteed, thereby providing the potential of using the microfluidic chip pump in precision fluid infusion.

FIG. 1 is a schematic diagram illustrating an exemplary application scenario of a dispensing system according to some embodiments of the present disclosure. The dispensing system 100 may be configured to dispense a fluid to an object (e.g., the application member 140) discontinuously (or continuously), for a single time or multiple times. The fluid may include any substance that can flow. Exemplary fluid may include a liquid, a gas, a plasma, etc. Exemplary liquid may include a nutrient solution (e.g., a vitamin, a saline solution, etc.), a drug solution (e.g., an insulin solution, an analgesic drug (e.g., morphine, Dolantin, Etorphine, etc.), a hormone drug, antibiotics, an anti-inflammatory drug, etc.). The application member 140 may be a biological object (e.g., body of a human being, body of an animal, cultured tissue or cells, etc.) or non-biological object (e.g., a phantom, a fluid detection assembly, etc.). Merely by way of example, the application member 140 may be a patient with one or more disorders or diseases (e.g., diabetes mellitus, obesity, etc.).

As shown in FIG. 1, the dispensing system 100 may include a dispensing device 110, a network 120, one or more terminals 130, and/or a storage device 150. The components in the dispensing system 100 may be connected in one or more of various ways. Merely by way of example, the dispensing device 110 may be connected to the terminal 130 through the network 120. As another example, the dispensing device 110 may be connected to the terminal 130 directly as indicated by the bi-directional arrow in dotted lines linking the dispensing device 110 and the terminal 130. As still another example, the storage device 150 may be connected to the dispensing device 110 directly or through the network 120.

The dispensing device 110 may be configured to dispense or deliver a certain volume (e.g., a desired volume) of fluid to an application member 140. In some embodiments, the dispensing device 110 may be portable. In some embodiments, the dispensing device 110 may include a pump 111, a control assembly 112, and/or a fluid reservoir 114. In some embodiments, the pump 111 may be configured to dispense, deliver, or pump a predetermined volume (e.g., a fixed volume) of fluid (e.g., from the fluid reservoir 114) to the application member 140 in each operation. One operation of the pump 111 may refer to a single shot of the pump 111. In some embodiments, the pump 111 may perform continuous pumping of a liquid (also referred to as an analog pump), and one operation (or one single shot) of the pump 111 may refer to a pumping of liquid from the start of the pump 111 until the stop of the pump 111. In some embodiments, the pump 111 may perform discontinuous, discrete, or digital pumping of liquid (also referred to as a digital pump or quantum dispensing), in which the pump 111 may pump out a unit volume of liquid each time, and may pump one or more times from the start of the pump 111 until the stop of the pump 111. Accordingly, one operation (or one single shot) of the pump 111 may refer to a pumping of one unit volume of liquid.

In some embodiments, if the pump 111 is implemented in a configuration of an analog pump, the dispensing device 110 may further include a flow detection assembly configured to detect an actual volume of the dispensed or delivered liquid. However, such a configuration of the dispensing device 110 may be complicated, and a size of the dispensing device 110 may be relatively large. In some embodiments, when the pump 111 is implemented in a configuration of a digital pump, the flow detection assembly may be unnecessary, and thus the configuration of the dispensing device 110 may be simplified, and the size of the dispensing device 110 can be relatively small. In some embodiments of the digital pump configuration, when the target volume is set, the pump is set to dispense fluid for a number of times until reaching the target volume, each time a same amount is dispensed. In some cases, this approach allows for simplified pump structure and easy monitoring and control of volume dispensed. By adjusting the frequency of using the pump 111 to dispense the fluid (i.e., the dispensing times of the pump 111 in a unit time), the dispensing of a target volume of fluid can be achieved. Therefore, the dispensing accuracy can be increased by increasing the accuracy of the unit volume, and the accuracy of the unit volume may be guaranteed because of the configuration of the pump 111 (e.g., stable position(s) of a moveable member of the pump 111). Besides, no feedback of the actual status of the fluid is needed, and thus the dispensing system 100 can be simplified, the cost can be lowered, the stable dispensing can be achieved quickly, and the accurate dispensing for a relatively long time (or each time) can be guaranteed, thereby providing the potential of using the dispensing device 110 in precision fluid infusion.

In some embodiments, the fluid may include an insulin solution, and the pump 111 may be an insulin pump. In some embodiments, the fluid may include a gas, and the pump 111 may be a gas pump.

Figure 2:
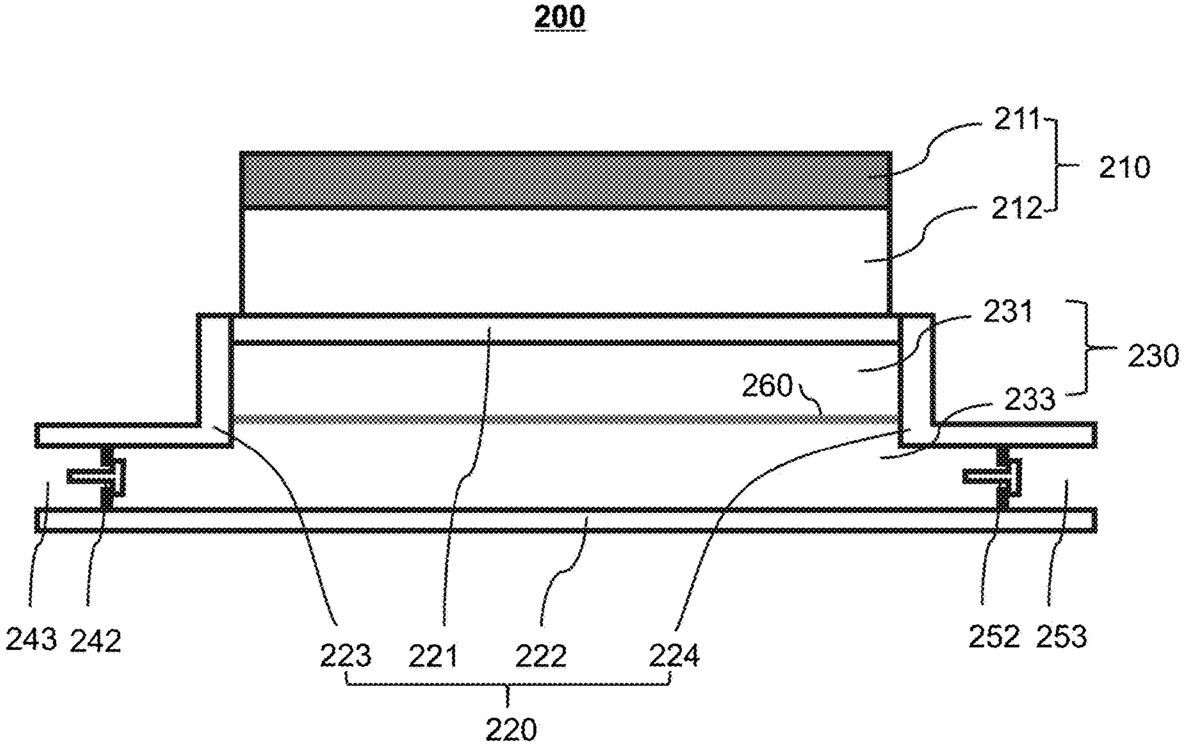
FIG. 2 is a schematic diagram illustrating a sectional view of an exemplary microfluidic chip pump according to some embodiments of the present disclosure.
Figure 3A:
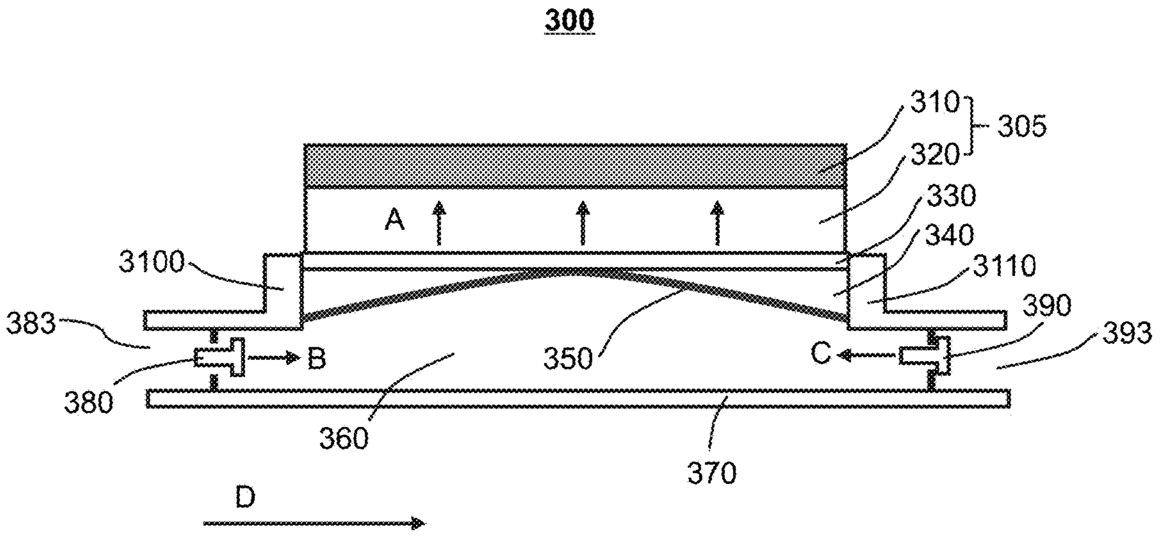
FIGS. 3A-3B are schematic diagrams illustrating a sectional view of an exemplary microfluidic chip pump with a moveable member at different stable positions according to some embodiments of the present disclosure.
Figure 3B:
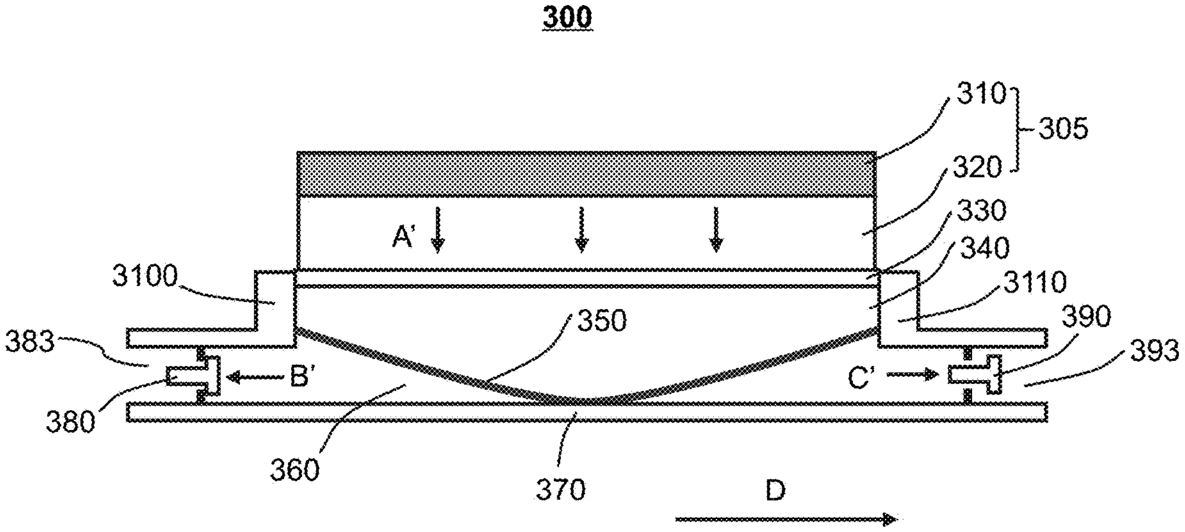
Figure 4A:
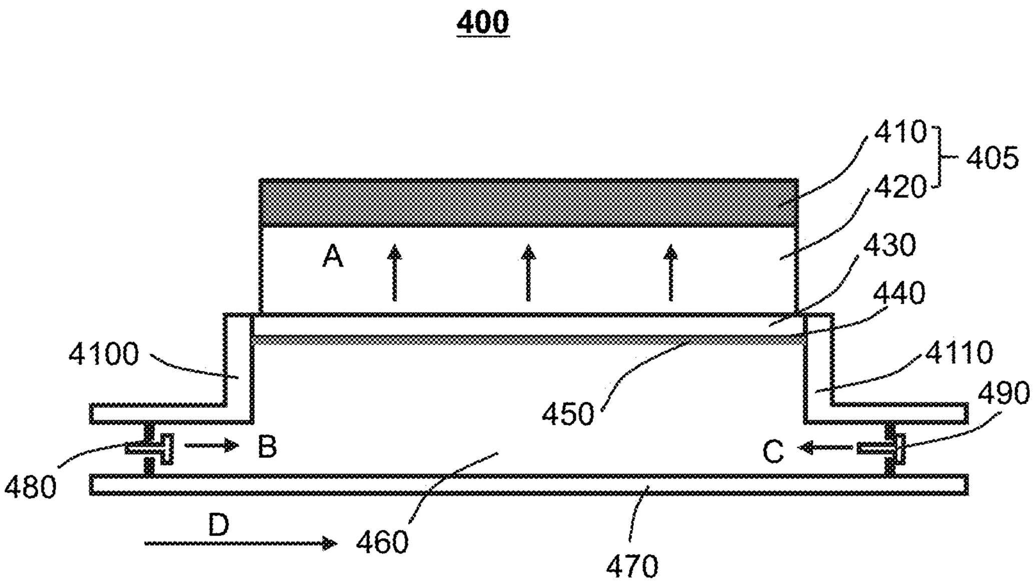
FIGS. 4A-4B are schematic diagrams illustrating a sectional view of an exemplary microfluidic chip pump with another moveable member at different stable positions according to some embodiments of the present disclosure.
Figure 4B:
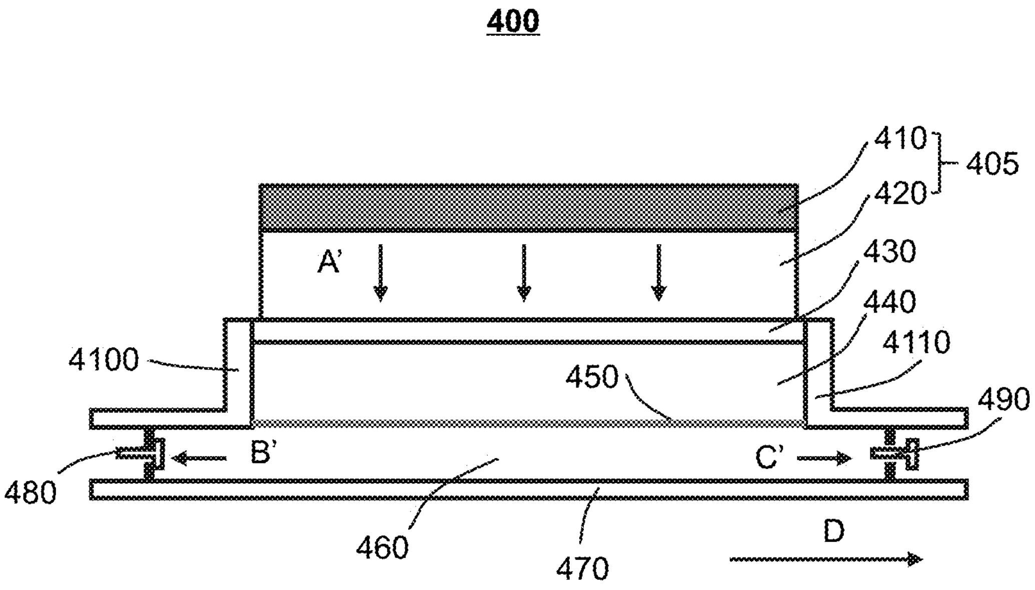

In some embodiments, the pump 111 may be a microfluidic chip pump (e.g., the microfluidic chip pump 200 illustrated in FIG. 2, the microfluidic chip pump 300 illustrated in FIG. 3, the microfluidic chip pump 400 illustrated in FIG. 4). The microfluidic chip pump may include a pump housing including pump walls and a pump cavity, a moveable member arranged in the pump cavity, and an actuator assembly configured to drive the moveable member between a first stable position and a second stable position. More descriptions of the microfluidic chip pump may be found elsewhere in the present disclosure (e.g., FIGS. 2-4B and descriptions thereof).

The control assembly 112 may be configured to control the operation of the pump 111. Specifically, the control assembly 112 may control a start/stop of the pump 111, a dispensing volume of each operation of the pump 111, an operation count of the pump 111, a total dispensing volume of the pump 111, a dispensing frequency of the pump 111, etc. In some embodiments, the control assembly 112 may provide one or more control signals for the pump 111 (e.g., an actuator assembly of the pump 111). In some embodiments, the control assembly 112 may include one or more control circuitries (e.g., a first control circuitry configured to control the operation of one or more valves of the microfluidic chip pump illustrated in FIGS. 3A-3B, a second control circuitry configured to control the operation of a moveable member of the microfluidic chip pump illustrated in FIGS. 3A-3B, etc.). In some embodiments, the control assembly 112 may achieve quantitative dispensing of the fluid by adjusting the count of operations of the pump 111. More descriptions of the controlling of the quantitative dispensing may be found elsewhere in the present disclosure (e.g., FIGS. 6-7 and descriptions thereof).

In some embodiments, the control assembly 112 may receive one or more instructions from the terminal(s) 130 and generate corresponding control signal(s) based on the instruction(s). In some embodiments, the instruction(s) may be inputted or provided by a user (e.g., the application member 140) into the terminal(s) 130. Merely by way of example, if the user knows that a blood glucose concentration of the user is higher than a threshold, the user may provide the instruction(s) via the terminal(s). In some embodiments, the terminal(s) 130 may generate the instruction(s) automatically, for example, according to a prescribed prescription (e.g., provided by a doctor). In some embodiments, the control assembly 112 may generate corresponding control signal(s) based on the prescribed prescription automatically. In some embodiments, the control assembly 112 may communicate with an external device (e.g., a blood glucose detector) (not shown) and generate corresponding control signal(s) automatically. For example, the user may use the blood glucose detector to detect the blood glucose concentration. If the blood glucose concentration is higher than a threshold, the blood glucose detector may transmit instruction(s) to the control assembly 112, and the control assembly 112 may generate corresponding control signal(s). In some embodiments, the control assembly 112 may receive instruction(s) from a health management service platform, and may generate corresponding control signal(s).

The fluid reservoir 114 may be configured to reserve the fluid (e.g., an insulin solution). The fluid reservoir 114 may be operably coupled to the pump 111 and provide a certain amount of fluid for the pump 111 when needed. In some embodiments, the fluid reservoir 114 may be directly connected to the pump 111. In some embodiments, the fluid reservoir 114 may be connected to the pump 111 through a tube. In some embodiments, the fluid reservoir 114 may be part of the pump 111. In some embodiments, the fluid reservoir 114 may be positioned in an external space of the pump 111.

In some embodiments, the pump 111 may be operably coupled to the application member 140. In some embodiments, the application member 140 may be part of the dispensing device 110. In some embodiments, the application member 140 may be part of the pump 111. In some embodiments, the pump 111 may be connected to the application member 140 via a tube. In some embodiments, before the dispensing device 110 (e.g., the pump 111) is in a working state, the pump 111 may be connected to the application member 140. For example, a tube connected to the pump 111 may be connected to a syringe needle, and the syringe needle may be inserted or embedded into the application member 140, such that the pump 111 is in a fluid communication with the application member 140. If the dispensing device 110 (e.g., the pump 111) is in working state, a certain amount of fluid can be dispensed into the application member 140 via the fluid communication between the pump 111 and the application member 140. In some embodiments, if the dispensing device 110 is in a standby state, the pump 111 may be disconnected from the application member 140. For example, the syringe needle may be released from the application member 140, or the tube connecting the pump 111 and the syringe needle may be released from the syringe needle, such that the fluid communication between the pump 111 and the application member 140 is broken. In some embodiments, the fluid communication between the pump 111 and the application member 140 may be maintained whether the dispensing device 110 (e.g., the pump 111) is in working state or not. In some embodiments, the user (e.g., the application member 140) may determine to maintain or break the fluid communication between the pump 111 and the application member 140.

The network 120 may include any suitable network that can facilitate the dispensing system 100 to exchange information and/or data. In some embodiments, one or more components (e.g., the dispensing device 110, the terminal(s) 130, the storage device 150, etc.) of the dispensing system 100 may communicate information and/or data with one another via the network 120. For example, the dispensing device 110 may obtain instruction(s) from the terminal(s) 130 via the network 120. The network 120 may be and/or include a public network (e.g., the Internet), a private network (e.g., a local area network (LAN), a wide area network (WAN), etc.), a wired network (e.g., an Ethernet), a wireless network (e.g., an 802.11 network, a Wi-Fi network, etc.), a cellular network (e.g., a Long Term Evolution (LTE) network), an image relay network, a virtual private network ("VPN"), a satellite network, a telephone network, a router, a hub, a switch, a server computer, and/or a combination of one or more thereof. For example, the network 120 may include a cable network, a wired network, a fiber network, a telecommunication network, a local area network, a wireless local area network (WLAN), a metropolitan area network (MAN), a public switched telephone network (PSTN), a Bluetooth™ network, a ZigBee™ network, a near field communication network (NFC), or the like, or a combination thereof. In some embodiments, the network 120 may include one or more network access points. For example, the network 120 may include wired and/or wireless network access points, such as base stations and/or network switching points, through which one or more components of the dispensing system 100 may access the network 120 for data and/or information exchange.

In some embodiments, a user (e.g., a doctor, an operator, or the application member 140) may operate the dispensing system 100 through the terminal(s) 130. The terminal(s) 130 may include a mobile device 131, a tablet computer 132, a laptop computer 133, or the like, or a combination thereof. In some embodiments, the mobile device 131 may include a smart home device, a wearable device, a mobile device, a virtual reality device, an augmented reality device, or the like. In some embodiments, the smart home device may include a smart lighting device, a control device of an intelligent electrical apparatus, a smart monitoring device, a smart television, a smart video camera, an interphone, or the like, or a combination thereof. In some embodiments, the wearable device may include a bracelet, footgear, glasses, a helmet, a watch, clothing, a backpack, a smart accessory, or the like, or a combination thereof. In some embodiments, the mobile device may include a mobile phone, a personal digital assistant (PDA), a gaming device, a navigation device, a point of sale (POS) device, a laptop, a tablet computer, a desktop, or the like, or a combination thereof. In some embodiments, the virtual reality device and/or augmented reality device may include a virtual reality helmet, virtual reality glasses, a virtual reality eyewear, an augmented reality helmet, augmented reality glasses, an augmented reality eyewear, or the like, or a combination thereof. For example, the virtual reality device and/or augmented reality device may include a Google Glass™, an Oculus Rift™, a Hololens™, a Gear VR™, or the like. In some embodiments, the terminal(s) 130 may be part of the dispensing device 110. In some embodiments, the control assembly 112 may be integrated in the terminal(s) 130. In some embodiments, the terminal(s) 130 may be operably coupled to the pump 111.

The storage device 150 may store data, instructions, and/or any other information. In some embodiments, the storage device 150 may store data obtained from the terminal(s) 130, and/or the dispensing device 110. For example, the storage device 150 may store a prescribed prescription associated with the dispensing of the fluid. As another example, the storage device 150 may store historical data associated with the dispensing of the fluid (e.g., when the fluid was dispensed, how much fluid was dispensed, the operation count of the pump 111, etc.). In some embodiments, the storage device 150 may include a mass storage device, a removable storage device, a volatile read-and-write memory, a read-only memory (ROM), or the like. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be executed on a cloud platform. For example, the cloud platform may include a private cloud, a public cloud, a hybrid cloud, a community cloud, a distributed cloud, an interconnected cloud, a multiple cloud, or the like, or a combination thereof.

In some embodiments, the storage device 150 may be connected to the network 120 to communicate with one or more other components (e.g., the dispensing device 110, the terminal(s) 130, etc.) of the dispensing system 100. One or more components of the dispensing system 100 may access data or instructions stored in the storage device 150 via the network 120. In some embodiments, the storage device 150 may be directly connected to or communicate with one or more other components (e.g., the dispensing device 110, the terminal(s) 130, etc.) of the image processing system 100. In some embodiments, the storage device 150 may be part of the dispensing device 110. For example, the storage device 150 may be integrated in the control assembly 112. In some embodiments, the storage device 150 may be part of the terminal(s) 130.

In some embodiments, the dispensing system 100 (e.g., the dispensing device 110) may further include one or more sensors configured to monitor a status of the dispensing system 100 (e.g., the dispensing device 110). In some embodiments, the pump 111 (e.g., the microfluidic chip pump(s) illustrated in FIGS. 2-4) may be operably coupled to or include one or more sensors configured to monitor a working status of the pump 111. In some embodiments, the status of the dispensing system 100 (e.g., the dispensing device 110, the pump 111) to be monitored may include a pressure, temperature, and/or flow of the fluid in the dispensing system 100, for example, a pressure of the fluid inside the pump 111, a pressure of the fluid inside a tube connecting the fluid reservoir 114 and the pump 111, a pressure of the fluid inside a tube connecting the pump 111 and the application member 140, a temperature of the fluid inside the pump 111, a temperature of the fluid inside a tube connecting the fluid reservoir 114 and the pump 111, a temperature of the fluid inside a tube connecting the pump 111 and the application member 140, a flow of the fluid inside the pump 111, a flow of the fluid inside a tube connecting the fluid reservoir 114 and the pump 111, a flow of the fluid inside a tube connecting the pump 111 and the application member 140, etc. In some embodiments, the sensor(s) may include a pressure sensor, a temperature sensor, and/or a flow sensor. In some embodiments, the sensor(s) may be operably coupled to the pump 111, the fluid reservoir 114, the tube connecting the fluid reservoir 114 and the pump 111, the tube connecting the pump 111 and the application member 140, or anywhere else in the dispensing system 100.

In some embodiments, according to the monitored status(es) of the dispensing system 100, the control assembly 112 or the terminal(s) 130 may determine an abnormal situation of the dispensing system 100, for example, whether a blocking of the tube(s) of the dispensing system 100 happens, whether the fluid reservoir 114 is empty, whether the pump 111 fails, whether one or more air bubbles are present in the dispensing system 100, whether a fluid leakage happens, etc. In some embodiments, the dispensing system 100 may further include an alarm unit configured to send out an alarm signal when the dispensing system 100 is in an abnormal situation. More descriptions of the sensor(s), the monitoring of the status(es) of the dispensing system 100, and the alarm unit may be found in Chinese Patent Application No. 201811145948.0 entitled "ABNORMAL SITUATION DETECTION OF A MICROFLUIDIC CHIP PUMP AND A CONTROL SYSTEM THEREOF." filed Sep. 29, 2018, the contents of which are hereby incorporated by reference.

FIG. 2 is a schematic diagram illustrating a sectional view of an exemplary microfluidic chip pump according to some embodiments of the present disclosure. As shown in FIG. 2, the microfluidic chip pump 200 may include a pump housing 220, a moveable member 260, and an actuator assembly 210.

The pump housing 220 may be configured to define a space of the microfluidic chip pump 200 and enclose one or more internal components (e.g., the moveable member 260) of the microfluidic chip pump 200. In some embodiments, the pump housing 220 may include a first wall 221, a second wall 222, a third wall 223, and/or a fourth wall 224. In some embodiments, the pump housing 220 may include a pump cavity 230. In some embodiments, the pump cavity 230 may be a space defined by the first wall 221, the second wall 222, the third wall 223, the fourth wall 224, the inlet valve 242, and the outlet valve 252. In some embodiments, at least a portion of the pump cavity 230 may be configured to accommodate a fluid. More descriptions of the fluid may be found elsewhere in the present disclosure (e.g., FIG. 1 and descriptions thereof).

In some embodiments, the third wall 223 and the fourth wall 224 may be configured as an integral piece. In some embodiments, the first wall 221 may be configured to confine the moveable member 260 into a first stable position. In some embodiments, the first wall 221 may be flat. In some embodiments, the first wall 221 may have at least one curved surface (e.g., an arc-shaped surface). For example, a first surface of the first wall 221 facing the moveable member 260 may be an arc-shaped surface, while a second surface of the first wall 221 facing the actuator assembly 210 may be flat. In some embodiments, the second wall 222 may be configured to confine the moveable member 260 into a second stable position. In some embodiments, the second wall 222 may be flat. In some embodiments, the second wall 222 may have at least one curved surface (e.g., an arc-shaped surface). For example, a first surface of the second wall 222 facing the moveable member 260 may be an arc-shaped surface, while a second surface of the second wall 222 opposite to the first surface of the second wall 222 may be flat. In some embodiments, the third wall 223 and the fourth wall 224 may have an irregular shape. For example, a portion of the third wall 223 and the fourth wall 224 may be configured in a horizontal plane, while another portion of the third wall 223 and the fourth wall 224 may be configured in a vertical plane.

In some embodiments, the first wall 221 may be connected to the third wall 223 and the fourth wall 224 through a, for example, glue joint, bonding, bolted connection, or the like, or a combination thereof. In some embodiments, the first wall 221 and the third wall 223 (or the fourth wall 224) may be configured as a first integral piece. In some embodiments, the second wall 222 and the fourth wall 224 (or the third wall 223) may be configured as a second integral piece. In some embodiments, the first integral piece may be connected to the second integral piece through a, for example, glue joint, bonding, bolted connection, or the like, or a combination thereof. In some embodiments, the second wall 222 may be connected to the third wall 223 and the fourth wall 224 through a, for example, glue joint, bonding, bolted connection, or the like, or a combination thereof. In some embodiments, at least a portion of the second wall 222 and at least a portion of the third wall 223 may form an inlet channel 243 (also referred to as a first channel) configured to guide a fluid to flow (e.g., from the fluid reservoir 114) into the pump cavity 230. In some embodiments, at least a portion of the second wall 222 and at least a portion of the fourth wall 224 may form an outlet channel 253 (also referred to as a second channel) configured to guide a fluid to flow out of the pump cavity 230 (e.g., to the application member 140). In some embodiments, the first wall 221, the second wall 222, the third wall 223, and/or the fourth wall 224 may be rigid. In some embodiments, the first wall 221, the second wall 222, the third wall 223, and/or the fourth wall 224 may have a fixed relative position.

In some embodiments, the first wall 221, the second wall 222, the third wall 223, and/or the fourth wall 224 may be made of a same material or different materials. Exemplary materials may include inorganic materials, plastic materials, metallic materials, ceramic materials, and/or composite materials. Exemplary inorganic materials may include silica, glass, crystalline silicon, quartz, or any other inorganic materials. Exemplary plastic materials may include cross-linked polymer chains (e.g., polydimethylsiloxane (PDMS)), thermosets (e.g., SU-8 photoresist and polyimide), and/or thermoplastics (e.g., poly(methylmethacrylate) (PMMA), polycarbonate (PC), polystyrene (PS), polyethylene terephthalate (PET), polyvinylchloride (PVC)). Exemplary metallic materials may include iron, copper, nickel, a compound or alloy (e.g., stainless steel, nickel titanium alloy), etc. Exemplary ceramic materials may include aluminum oxide ceramics, silicon nitride ceramics, silicon carbide ceramics, hexagonal boron nitride ceramics, etc. In some embodiments, the material(s) used to make the first wall 221, the second wall 222, the third wall 223, and/or the fourth wall 224 may have a biocompatibility. Exemplary biocompatibility materials may include titanium alloy, nickel titanium alloy, cobalt alloy, aluminum oxide (alumina), medical carbon material, hydroxyapatite (HAP), bioactive glass (BAG), polyethylene (PE), polypropylene (PP), polyacrylate, aromatic polyester, polyformaldehyde (POM), collagen, chitin, polylactide (PLA), polyethylene glycol (PEG). In some embodiments, an inner surface of the pump housing 220 (e.g., the first wall 221, the second wall 222, the third wall 223, and/or the fourth wall 224) may be coated with a biocompatibility material.

In some embodiments, the moveable member 260 may be configured to pump out at least a portion of the fluid accommodated in the pump cavity 230. In some embodiments, the pump cavity 230 may include a first chamber 231 and a second chamber 233. In some embodiments, the first chamber 231 and the second chamber 233 may be separated by the moveable member 260. In some embodiments, the first chamber 231 may refer to a chamber defined by the first wall 221, the moveable member 260, the third wall 223, and/or the fourth wall 224. In some embodiments, the second chamber 233 may refer to a chamber defined by the second wall 222, the moveable member 260, the third wall 223, the fourth wall 224, the inlet valve 242, and/or the outlet valve 252. In some embodiments, the first chamber 231 may be filled with a first medium (e.g., a liquid, a gas, etc.), while the second chamber 233 may be filled with a second medium (e.g., the fluid). In some embodiments, the moveable member 260 may be airtightly connected to or operably coupled to the pump housing 220 (e.g., the third wall 223 and the fourth wall 224). In some embodiments, the moveable member 260 may block a medium interchange between the first medium in the first chamber 231 and the second medium in the second chamber 233. In some embodiments, the moveable member 260 may have a flat or curved surface (e.g., an arc-shaped surface). In some embodiments, a base level of the moveable member 260 may be substantially parallel to a base level of the first wall 221 and/or a base level of the second wall 222.

In some embodiments, the moveable member 260 may be implemented in a configuration of a deformable membrane. In some embodiments, the moveable member 260 may be fixed to the pump housing 220 (e.g., the third wall 223 and the fourth wall 224), and may deform when being operated. In some embodiments, the deformable membrane may be made of an elastic material. Exemplary elastic materials may include elastomer (e.g., thermoplastic elastomer, thermoplastic polyurethanes), rubber (e.g., silicone), an elastic metal (e.g., stainless steel, nickel titanium alloy), or the like, or a combination thereof. In some embodiments, the moveable member 260 may be made of a biocompatibility material described elsewhere in the present disclosure, or the moveable member 260 may be coated with a biocompatibility material. In some embodiments, to facilitate the operation of the moveable member 260, the moveable member 260 may have a relatively thin thickness. In some embodiments, the thickness of the moveable member 260 may be associated with the material of the moveable member 260. For example, if the moveable member 260 is made of an elastomer, the thickness of the moveable member 260 may be within, e.g., 0.1-1 mm (e.g., 0.1-0.2 mm). As another example, if the moveable member 260 is made of an elastic metal, the thickness of the moveable member 260 may be thinner than the elastomer, e.g., 0.01-0.05 mm (e.g., 0.02-0.03 mm). The moveable member 260 with a relatively thin thickness may have a relatively fast response when being operated. The operation of the moveable member 260 may pump out a certain volume of fluid, e.g., via the outlet channel 253 to the application member 140. For example, the moveable member 260 may be operated (e.g., driven by the actuator assembly 210) between a first stable position and a second stable position, changing a volume of the first chamber 231 and a volume of the second chamber 233, and expelling a certain volume of fluid from the second chamber 233 once the moveable member 260 is driven from the first stable position to the second stable position. More descriptions of the moveable member 260 implemented in a configuration of a deformable membrane, the stable position(s), and the operation of the moveable member 260 may be found elsewhere in the present disclosure (e.g., FIGS. 3A-3B and descriptions thereof).

In some embodiments, the moveable member 260 may be implemented in a configuration of a moveable piston. In some embodiments, the moveable member 260 may be airtightly coupled to the pump housing 220 (e.g., the third wall 223 and the fourth wall 224), and may move when being operated. In some embodiments, the moveable member 260 may have a flat surface. In some embodiments, the moveable member 260 may not fix to the pump housing 220 but may move relative to the pump housing 220. The operation of the moveable member 260 may pump out a certain volume of fluid, e.g., via the outlet channel 253 to the application member 140. For example, the moveable member 260 may be operated (e.g., driven by the actuator assembly 210) between two or more stable positions, changing a volume of the second chamber 233, and expelling a certain volume of fluid from the second chamber 233 once the moveable member 260 is driven from a stable position relatively far away from the second wall 222 to a stable position relatively close to the second wall 222. It should be noted that if the moveable member 260 is implemented in a configuration of a moveable piston, the first wall 221 may not be connected to the third wall 223 and the fourth wall 224, the first wall 221 may be movable, or the first wall 221 may be omitted. More descriptions of the moveable member 260 implemented in a configuration of a moveable piston, the stable position(s), and the operation of the moveable member 260 may be found elsewhere in the present disclosure (e.g., FIGS. 4A-4B and descriptions thereof).

In some embodiments, the moveable member 260 may be a magnetic force driving member. For example, the actuator assembly 210 may generate and apply a magnetic force on the moveable member 260. In response to the magnetic force, the moveable member 260 may be driven between different stable positions. In some embodiments, the moveable member 260 may be magnetic. In some embodiments, the moveable member 260 may conduct a current and can be driven by the magnetic force.

In some embodiments, the actuator assembly 210 may be configured to drive the moveable member 260 to be operated. For example, the actuator assembly 210 may drive the moveable member 260 between two or more stable positions (e.g., a first stable position and a second stable position). In some embodiments, if the moveable member 260 is positioned at different stable position(s), the first chamber 231 may have different volumes, and the second chamber 233 may have different volumes. In some embodiments, the actuator assembly 210 may include an actuation component 211 and a transmission component 212. In some embodiments, the actuation component 211 may be configured to generate one or more driving forces to drive the moveable member 260. In some embodiments, the actuation component 211 may receive one or more control signals from, e.g., the control assembly 112, and generate the driving force(s) based on the control signal(s). In some embodiments, the transmission component 212 may be configured to transmit the driving force(s) generated by the actuation component 211 to the moveable member 260, and cause the moveable member 260 to be operated between different stable position(s). In some embodiments, the actuation component 211 may be a motor, a piezoelectric actuator, a magnetic actuator, a metal memory component, a thermal deformation-related component, or the like, or a combination thereof. In some embodiments, the transmission component 212 may be a hydraulic transmission device, a pneumatic transmission device, a mechanical transmission device, or any combination of thereof. In some embodiments, the actuation component 211 and the transmission component 212 may be coupled with each other as shown in FIGS. 2-4B. In some embodiments, the actuation component 211 and the transmission component 212 may be configured as an integral assembly.

In some embodiments, the actuator assembly 210 may be operably coupled to the pump housing 220 (e.g., the first wall 221, the third wall 223, and/or the fourth wall 224) through a, e.g., threaded connection, spline connection, adhesive connection, rivet connection, welding connection, or the like, or a combination thereof. In some embodiments, the actuator assembly 210 may be operably coupled to the moveable member 260 to drive the moveable member 260. For example, as illustrated in FIGS. 3A-3B, the actuator assembly 305 may be operably coupled to the moveable member 350 via a medium in the transmission component 320 and a medium in the first chamber 340, and the driving force(s) may be transmitted to the moveable member 350 via the medium in the transmission component 320 and the medium in the first chamber 340. More descriptions of the transmitted of the driving force(s) from the transmission component 212 to the moveable member 260 may be found elsewhere in the present disclosure (e.g., FIGS. 3A-3B and descriptions thereof). As another example, as illustrated in FIGS. 4A-4B, the actuator assembly 405 may be operably coupled to the moveable member 450 via, e.g., a connecting rod (not shown), and the driving force(s) may be transmitted to the moveable member 450 via the connecting rod.

It should be noted that the actuator assembly 210 located above the pump housing 220 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the actuator assembly 210 may be located under the pump housing 220. As another example, the actuator assembly 210 may be located on a side of the pump housing 220.

In some embodiments, a volume of the pump cavity 230 (e.g., the first chamber 231, the second chamber 233) may be relatively small, for example, 0.01 μL-10 mL (e.g., 0.1 μL, 0.25 μL, 0.5 μL, etc.). Accordingly, a unit volume of liquid pumped out by the microfluidic chip pump 200 in one operation may be relatively small, which makes the microfluidic chip pump 200 suitable for delivering of micro volume (or even trace volume) of fluid to the application member 140. Merely by way of example, if the fluid is an insulin fluid, and the application member 140 is a patient with diabetes mellitus, the microfluidic chip pump 200 may be configured to perform delivering of micro volume or trace volume of insulin fluid to the patient in each operation, a total volume of insulin fluid may be delivered in multiple operations, and the total volume may be adjusted by controlling the delivering times or delivering frequencies. Therefore, the control of the total volume of fluid may be facilitated, and the delivering procedure may be more reasonable and scientific, thereby benefiting the treatment and recovery of the patient. Besides, the small and precise dispensing may reduce or eliminate drug waste, and reduce or eliminate side effects for the patient. In some embodiments, at least a portion of the microfluidic chip pump 200 (e.g., the pump housing 220) may be fabricated using a microfabrication technique, including for example, cleaning, photolithography, thermal growth, etching, printing, or the like, or any combination thereof.

In some embodiments, the fluid reservoir 114 may be in fluid communication with the inlet valve 242 through the inlet channel 243. In some embodiments, the inlet valve 242 may be in fluid communication with the second chamber 233. In some embodiments, the inlet valve 242 may be configured to control a flow of the fluid from the inlet channel 243 into the second chamber 233. In some embodiments, the application member 140 may be in fluid communication with the outlet valve 252 through the outlet channel 253. In some embodiments, the outlet valve 252 may be in fluid communication with the second chamber 233. In some embodiments, the outlet valve 252 may be configured to control a flow of the fluid from the second chamber 233 into the outlet channel 253. In some embodiments, the inlet valve 242 and/or the outlet valve 252 may be active valves. In some embodiments, the open/close state of the active valve(s) may be controlled by a control circuitry (e.g., a control circuitry integrated in the control assembly 112). In some embodiments, the active valve(s) may receive control signal(s) from the control circuitry and perform open/close command(s) accordingly. In some embodiments, the control assembly 112 may control the open/close state of the inlet valve 242 and/or the outlet valve 252 according to the operation of the moveable member 260. For example, if the control assembly 112 needs to control the pumping of the fluid into the pump cavity 230, the moveable member 260 may be driven from the second stable position to the first stable position, the inlet valve 242 may be controlled to be open, and the outlet valve 252 may be controlled to be closed. As another example, if the control assembly 112 needs to control the pumping out of the fluid from the pump cavity 230, the moveable member 260 may be driven from the first stable position to the second stable position, the inlet valve 242 may be controlled to be closed, and the outlet valve 252 may be controlled to be open.

In some embodiments, the inlet valve 242 and/or the outlet valve 252 may be passive valves. In some embodiments, the inlet valve 242 and the outlet valve 252 may be one-way valves. When a first fluid pressure in the inlet channel 243 is larger than a second fluid pressure in the second chamber 233, the inlet valve 242 may be open because of the pressure difference between the first fluid pressure and the second fluid pressure. The fluid may be allowed to flow from the inlet channel 243 into the second chamber 233. When a first fluid pressure in the inlet channel 243 is smaller than a fluid pressure in the second chamber 233, the inlet valve 242 may be closed because of the pressure difference between the first fluid pressure and the second fluid pressure. The fluid may be prevented from flowing from the second chamber 233 back to the inlet channel 243. When a third fluid pressure in the outlet channel 253 is smaller than a second fluid pressure in the second chamber 233 (e.g., the outlet channel 253 may include no fluid, and the fluid pressure in the outlet channel 253 may be 0), the outlet valve 252 may be open because of the pressure difference between the third fluid pressure and the second fluid pressure. The fluid may be allowed to flow from the second chamber 233 into the outlet channel 253. When a third fluid pressure in the outlet channel 253 is larger than a second fluid pressure in the second chamber 233, the outlet valve 252 may be closed because of the pressure difference between the third fluid pressure and the second fluid pressure. The fluid may be prevented from flowing from the outlet channel 253 back to the second chamber 233. In certain embodiments, the inlet valve 242 and the outlet valve 252 are both passive valves. Such a design may make the pump structure simpler and reduce cost. In some embodiments, in order to enhance the tightness and reliability of the passive valve(s) (e.g., the inlet valve 242 and the outlet valve 252) to prevent fluid leakage, the passive valve(s) may be preloaded with a pretightening force. The pretightening force may be configured to close the passive valve(s) tightly when there is no fluid pressure difference between the two sides of the passive valve(s) (e.g., when the third fluid pressure and the second fluid pressure are equal, or the first fluid pressure and the second fluid pressure are equal).

FIGS. 3A-3B are schematic diagrams illustrating a sectional view of an exemplary microfluidic chip pump with a moveable member at different stable positions according to some embodiments of the present disclosure. In some embodiments, similar to the microfluidic chip pump 200 illustrated in FIG. 2, the microfluidic chip pump 300 may include an actuator assembly 305 which includes an actuation component 310 and a transmission component 320, a first wall 330, a first chamber 340, the moveable member 350, a second chamber 360, a second wall 370, an inlet valve 380, an outlet valve 390, a third wall 3100 and a fourth wall 3110. In some embodiments, the third wall 3100 and the fourth wall 3110 may be configured as an integral piece. More descriptions of the microfluidic chip pump 300 and corresponding components may be found elsewhere in the present disclosure (e.g., FIG. 2 and descriptions relating to the microfluidic chip pump 200).

In some embodiments, the moveable member 350 may be deformable or operable. In some embodiments, the moveable member 350 may be made of an elastic material described elsewhere in the present disclosure. In some embodiments, the moveable member 350 may be made of a rigid material described elsewhere in the present disclosure. In some embodiments, the moveable member 350 may be implemented in any suitable configuration, e.g., a membrane, a sheet, a plate, etc. For example, the moveable member 350 may be a deformable membrane. The moveable member 350 may be at two or more stable positions. The moveable member 350 may be driven (e.g., by the actuator assembly 305) between the stable positions.

As shown in FIG. 3A, the moveable member 350 of the microfluidic chip pump 300 may be at a first stable position. In some embodiments, the first stable position may refer to a position that the moveable member 350 (or at least a portion thereof) is closest to the first wall 330. In some embodiments, the moveable member 350 (or at least a portion thereof, e.g., a central region of the moveable member 350) may abut the first wall 330 when in the first stable position. In some embodiments, at the first stable position, the moveable member 350 may fit closely with the first wall 330. In some embodiments, at the first stable position, there may be no space or gap between a part of the moveable member 350 and the first wall 330. In some embodiments, in order to facilitate the close fitting between the moveable member 350 and the first wall 330, a surface of the first wall 330 facing the moveable member 350 may be curved (e.g., arc-shaped). In some embodiments, the moveable member 350 may hang towards the first wall 330 when in the first stable position. For example, a central region of the moveable member 350 may protrude towards the first wall 330 without attaching the first wall 330 when in the first stable position. If the moveable member 350 is at the first stable position shown in FIG. 3A, at least a portion of the moveable member 350 may occupy at least a portion of the space of the first chamber 340, the first chamber 340 may have a minimum volume, and accordingly, the second chamber 360 may have a maximum volume. In some embodiments, the minimum volume of the first chamber 340 may be approximately 0, while the maximum volume of the second chamber 360 may be substantially equal to the volume of the pump cavity that includes the first chamber 340 and the second chamber 360. It should be noted that because of the structure and/or material of the moveable member 350, and/or the presence of the first wall 330, the first stable position is a first fixed position, and each time the moveable member 350 is driven (e.g., from the second stable position) to the first stable position, the moveable member 350 arrives at the same fixed position (the first stable position). Preferably, in certain embodiments, the moveable member 350 is configured to be unable to stop between the second stable position and the first stable position due to the structure and/or materials of the moveable member 350, as well as the structure and/or material of the pump housing. Therefore, each time the moveable member 350 is driven (e.g., from the second stable position) to the first stable position, the first chamber 340 may have a first fixed volume (i.e., the minimum volume of the first chamber 340), and the second chamber 360 may have a second fixed volume (i.e., the maximum volume of the second chamber 360).

As shown in FIG. 3B, the moveable member 350 of the microfluidic chip pump 300 may be at a second stable position. It should be noted that the microfluidic chip pump 300 shown in FIG. 3A is the same as the microfluidic chip pump 300 shown in FIG. 3B except that the moveable member 350 is at different stable positions. In some embodiments, the second stable position may refer to a position that the moveable member 350 (or at least a portion thereof) is closest to the second wall 370. In some embodiments, the moveable member 350 (or at least a portion thereof, e.g., a central region of the moveable member 350) may abut the second wall 370 when in the second stable position. In some embodiments, at the second stable position, the moveable member 350 may fit closely with the second wall 370. In some embodiments, at the second stable position, there may be no space or gap between the moveable member 350 and the second wall 370. In some embodiments, in order to facilitate the close fitting between the moveable member 350 and the second wall 370, a surface of the second wall 370 facing the moveable member 350 may be curved (e.g., arc-shaped). In some embodiments, the moveable member 350 may hang towards the second wall 370 when in the second stable position. For example, a central region of the moveable member 350 may protrude towards the second wall 370 without attaching the second wall 370 when in the second stable position. If the moveable member 350 is at the second stable position shown in FIG. 3B, at least a portion of the moveable member 350 may occupy at least a portion of the space of the second chamber 360, the second chamber 360 may have a minimum volume, and accordingly, the first chamber 340 may have a maximum volume. In some embodiments, the minimum volume of the second chamber 360 may be approximately 0, while the maximum volume of the first chamber 340 may be substantially equal to the volume of the pump cavity that includes the first chamber 340 and the second chamber 360. It should be noted that because of the structure and/or material of the moveable member 350, and/or the presence of the second wall 370, the second stable position is a second fixed position, and each time the moveable member 350 is driven (e.g., from the first stable position) to the second stable position, the moveable member 350 arrives at the same fixed position (e.g., the second stable position). Therefore, each time the moveable member 350 is driven (e.g., from the first stable position) to the second stable position, the first chamber 340 may have a third fixed volume (i.e., the maximum volume of the first chamber 340), and the second chamber 360 may have a fourth fixed volume (i.e., the minimum volume of the second chamber 360).

In some embodiments, the moveable member 350 may be implemented in a configuration of a deformable membrane. In some embodiments, the moveable member 350 of the microfluidic chip pump 300 may be driven between the first stable position and the second stable position by the actuator assembly 305 (e.g., the actuation component 310 and the transmission component 320). In some embodiments, the actuator assembly 305 may be operably coupled to the moveable member 350 to drive the moveable member 350. In some embodiments, the first wall 330 may have one or more through holes. In some embodiments, the transmission component 320 may be in fluid communication with the first chamber 340 via the hole(s) of the first wall 330. In some embodiments, the transmission component 320 and the first chamber 340 may form an airtight space, in which a medium (e.g., a liquid (e.g., water, oil), a gas (e.g., air), etc.) may be filled. In some embodiments, the medium may be different from the fluid in the second chamber 360. In some embodiments, the actuation component 310 may generate one or more driving force(s) based on one or more control signal(s). In some embodiments, the transmission component 320 may transmit the driving force(s) to the moveable member 350 (e.g., via the medium filled in the transmission component 320 and the first chamber 340) to drive the moveable member 350 between the first stable position and the second stable position.

In some embodiments, the actuation component 310 may be a motor, a piezoelectric actuator, a magnetic actuator, a metal memory component, a thermal deformation-related component, or any other actuators. In some embodiments, the transmission component 320 may be a hydraulic transmission device, and the medium filled in the transmission component 320 and the first chamber 340 may be liquid. In some embodiments, the medium filled in the transmission component 320 and the first chamber 340 may include a water-glycol hydraulic fluid, a phosphate hydraulic fluid, a fire-resistant hydraulic fluid, an aliphatic ester hydraulic fluid, or the like. In some embodiments, the transmission component 320 may be a pneumatic transmission device, and the medium filled in the transmission component 320 and the first chamber 340 may be a gas. When the actuation component 310 generates a driving force with a direction indicated by the arrow A as shown in FIG. 3A, the medium in the transmission component 320 and the moveable member 350 may be stretched along the direction indicated by the arrow A, the pressure of the medium applied on the moveable member 350 may be reduced, which can break the force balance on both surfaces of the moveable member 350, and then the moveable member 350 may be operated from the second stable position (see FIG. 3B) to the first stable position (see FIG. 3A). When the actuation component 310 generates a driving force with a direction indicated by the arrow A' as shown in FIG. 3B, the medium in the transmission component 320 and the moveable member 350 may be stretched along the direction indicated by the arrow A', the pressure of the medium applied on the moveable member 350 may be increased, which can break the force balance on both surfaces of the moveable member 350, and then the moveable member 350 may be operated from the first stable position (see FIG. 3A) to the second stable position (see FIG. 3B).

In some embodiments, the inlet valve 380 and the outlet valve 390 may be passive valves. In some embodiments, the inlet valve 380 and the outlet valve 390 may be one-way valves. When a fluid pressure in the inlet channel 383 is larger than a fluid pressure in the second chamber 360, the inlet valve 380 may be open (which is indicated by the arrow B in FIG. 3A) and allow the fluid to flow from the inlet channel 383 into the second chamber 360 (as indicated by the arrow D in FIG. 3A). When a fluid pressure in the inlet channel 383 is smaller than a fluid pressure in the second chamber 360, the inlet valve 380 may be closed (which is indicated by the arrow B' in FIG. 3B) and prevent the fluid from flowing from the second chamber 360 back to the inlet channel 383. When a fluid pressure in the outlet channel 393 is smaller than a fluid pressure in the second chamber 360 (e.g., the outlet channel 393 may include no fluid, and the fluid pressure in the outlet channel 393 may be 0), the outlet valve 390 may be open (which is indicated by the arrow C' in FIG. 3B) and allow the fluid to flow from the second chamber 360 into the outlet channel 393 (as indicated by the arrow D in FIG. 3B). When a fluid pressure in the outlet channel 393 is larger than a fluid pressure in the second chamber 360, the outlet valve 390 may be closed (which is indicated by the arrow C in FIG. 3A) and prevent the fluid from flowing from the outlet channel 393 back to the second chamber 360. The inlet valve 380 and the outlet valve 390 shown in FIGS. 3A-3B are merely provided for the purposes of illustration, and not intended to limit the scope of the present disclosure. More descriptions of the inlet valve 380 and the outlet valve 390 may be found elsewhere in the present disclosure (e.g., the inlet valve 242 and the outlet valve 252 in FIG. 2 and descriptions thereof). In some embodiments, the inlet valve 380 and/or the outlet valve 390 may be controlled by a first control circuitry. The first control circuitry may provide one or more control signals to the inlet valve 380 and/or the outlet valve 390 to cause the inlet valve 380 and/or the outlet valve 390 to be open or closed. In some embodiments, the first control circuitry may be disposed in a control device. In some embodiments, the first control circuitry may be disposed in the control assembly 112.

In some embodiments, as shown in FIG. 3A, the moveable member 350 may be driven (by the actuator assembly 305) from the second stable position to the first stable position. The arrow A indicates the direction of a driving force applied on the moveable member 350. The driving force may be perpendicular to the first wall 330, and may drive the moveable member 350 from the second stable position to the first stable position. In some embodiments, when the moveable member 350 moves from the second stable position to the first stable position, the volume of the second chamber 360 may be increased. Accordingly, the pressure of the fluid in the second chamber 360 may be decreased, and the fluid pressure in the second chamber 360 may be smaller than the fluid pressure in the inlet channel 383. Therefore, the inlet valve 380 may be open and allow the fluid to flow from the inlet channel 383 into the second chamber 360, while the outlet valve 390 may be closed. That is, when a driving force in a direction indicated by the arrow A in FIG. 3A is applied on the moveable member 350, the moveable member 350 may be operated from the second stable position to the first stable position, and a certain volume (e.g., a volume of the pump cavity, or a maximum volume of the second chamber 360) of fluid may be pumped into the second chamber 360.

In some embodiments, as shown in FIG. 3B, the moveable member 350 may be driven (by the actuator assembly 305) from the first stable position to the second stable position. The arrow A' indicates the direction of a driving force applied on the moveable member 350. The driving force may be perpendicular to the first wall 330, and may drive the moveable member 350 from the first stable position to the second stable position. In some embodiments, when the moveable member 350 moves from the first stable position to the second stable position, the volume of the second chamber 360 may be decreased. Accordingly, the pressure of the fluid in the second chamber 360 may be increased, and the fluid pressure in the second chamber 360 may be larger than the fluid pressure in the outlet channel 393. Therefore, the outlet valve 390 may be open and allow the fluid to flow from the second chamber 360 into the outlet channel 393, while the inlet valve 380 may be closed. That is, when a driving force in a direction indicated by the arrow A' in FIG. 3B is applied on the moveable member 350, the moveable member 350 may be operated from the first stable position to the second stable position, and a certain volume (e.g., a volume of the pump cavity, or a maximum volume of the second chamber 360) of fluid may be pumped out the second chamber 360.

In some embodiments, the actuator assembly 305 may be controlled by a second control circuitry. In some embodiments, the second control circuitry may provide one or more control signals to the actuator assembly 305 to drive the moveable member 350 between the first stable position and the second stable position. In some embodiments, the second control circuitry may be disposed in a control device. In some embodiments, the second control circuitry may be disposed in the control assembly 112. In some embodiments, the second control circuitry and the first control circuitry may share or be implemented as a same control circuitry. More descriptions of the second control circuitry may be found elsewhere in the present disclosure (e.g., FIGS. 6-7 and descriptions thereof).

In some embodiments, each time the moveable member 350 is driven from the first stable position to the second stable position, a fixed volume of fluid may be expelled from the second chamber 360 to the application member 140 via the outlet valve 390. As illustrated above, if the moveable member 350 is driven from the first stable position to the second stable position, the volume of the first chamber 340 may change from the first fixed volume to the third fixed volume, and accordingly, the volume of the second chamber 360 may change from the second fixed volume to the fourth fixed volume. The volume of the fluid expelled from the second chamber 360 may be equal to a first difference between the maximum volume (i.e., the third fixed volume) of the first chamber 340 and the minimum volume (i.e., the first fixed volume) of the first chamber 340 (or a second difference between the maximum volume (i.e., the second fixed volume) of the second chamber 360 and the minimum volume (i.e., the fourth fixed volume) of the second chamber 360). Therefore, the volume of the fluid expelled each time from the second chamber 360 may be fixed. In some embodiments, the first difference may be equal to the second difference. In some embodiments, a configuration of the first wall 330 with an arc-shaped surface and a configuration of the second wall 370 with an arc-shaped surface may guarantee the close fitting between the moveable member 350 and the first wall 330, and between the moveable member 350 and the second wall 370, which can make sure that the first stable position and the second stable position of the moveable member 350 are invariable. Accordingly, the fixed volume of the fluid expelled each time from the second chamber 360 can be guaranteed, the pumping performance of the microfluidic chip pump 300 can be improved, and the precision of flow control can be relatively high.

In some embodiments, the fixed volume of fluid expelled from the second chamber 360 may be in the range of 0.01 μL-10 mL, e.g., 0.01 μL, 0.02 μL, 0.04 μL, 0.08 μL, 0.1 μL, 0.25 μL, 0.5 μL, 1 μL, 1.5 μL, 2 μL, 2.5 μL, 3 μL, 4 μL, 5 μL, 6 μL, 7 μL, 8 μL, 9 μL, 10 μL, 1 mL, 2 mL, 5 mL, 10 mL, etc., or any volume therebetween. In some embodiments, the fixed volume of fluid expelled from the second chamber 360 may be in the range of 0.1 μL-2 μL. In some embodiments, the fixed volume of fluid expelled from the second chamber 360 may be 0.5 μL. In some embodiments, the fixed volume of fluid expelled from the second chamber 360 may be 0.25 μL. In some embodiments, the fixed volume may be determined by or associated with the volume (and/or dimension) of the first chamber 340, the volume (and/or dimension) of the second chamber 360, the dimension, structure, and/or material of the moveable member 350, and/or the driving force applied on the moveable member 350. For example, if the volumes of the first chamber 340 and the second chamber 360 are relatively large, the fixed volume of fluid expelled from the second chamber 360 may be relatively large, and vice versa. As indicated, the fixed volume of dispensed fluid in the current disclosure can be small (e.g., 0.1-2 μL). In some embodiments, such a small volume makes digital pumping (or quantum dispensing) possible because the small volume allows for multiple repetitions to precisely reach the target volume. In addition, it is technically challenging to dispense precise and small volumes repeatedly. In certain embodiments, the utilization of semiconductor engineering or microfabrication techniques makes small and precise dispensing possible.

It should be noted that in certain embodiments, as illustrated in FIGS. 3A-3B, the actuation component 310 may be implemented in a configuration of a piezoelectric actuator, the transmission component 320 may be implemented in a configuration of a hydraulic transmission device, and the inlet valve 380 and the outlet valve 390 may be passive valves. The moveable member 350 may be made of an elastomer, and the thickness of the moveable member 350 may be within, e.g., 0.1-0.2 mm. The volume of the pump cavity may be, e.g., 0.25 μL or 0.5 μL. When the moveable member 350 is at the first stable position, the minimum volume of the first chamber 340 may be 0, and the maximum volume of the second chamber 360 may be substantially the same as the volume of the pump cavity, e.g., 0.25 μL or 0.5 μL. When the moveable member 350 is at the second stable position, the maximum volume of the first chamber 340 may be substantially the same as the volume of the pump cavity, e.g., 0.25 μL or 0.5 μL, and the minimum volume of the second chamber 360 may be 0. Therefore, the microfluidic chip pump 300 may dispense 0.25 μL or 0.5 μL of fluid each time.

It should be noted that the above description of the moveable member 350 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the moveable member 350 may have more than two (e.g., three, four, five, etc.) stable positions. The moveable member 350 may be driven between the stable positions by applying driving forces with different magnitudes and/or directions. The fixed volume of fluid expelled from the second chamber 360 may be adjusted by driving the moveable member 350 between different stable positions.

FIGS. 4A-4B are schematic diagrams illustrating a sectional view of an exemplary microfluidic chip pump with another moveable member at different stable positions according to some embodiments of the present disclosure. In some embodiments, the microfluidic chip pump 400 may include an actuator assembly 405 which includes an actuation component 410 and a transmission component 420, a first wall 430, a first chamber 440, a moveable member 450, a second chamber 460, a second wall 470, an inlet valve 480, an outlet valve 490, a third wall 4100 and a fourth wall 4110. In some embodiments, the actuator assembly 405, the second wall 470, the inlet valve 480, the outlet valve 490, the third wall 4100 and the fourth wall 4110 may be the same as or similar to those of the microfluidic chip pump 300 illustrated in FIG. 3, and relevant descriptions are not repeated herein.

In some embodiments, the moveable member 450 may separate the pump cavity into the first chamber 440 and the second chamber 460. In some embodiments, the moveable member 450 may be implemented in a configuration of a moveable piston. In some embodiments, the moveable member 450 may be airtightly coupled to the third wall 4100 and the fourth wall 4110, and may move when being operated. In some embodiments, the moveable member 450 may have a flat surface. In some embodiments, the moveable member 450 may not fix to the pump housing but may move relative to the pump housing. The moveable member 450 may be driven (e.g., by the actuator assembly 405) between two or more stable positions to pump out a certain volume of fluid.

In some embodiments, the actuation component 410 may generate one or more driving force(s) based on one or more control signal(s). More descriptions of the control signal(s) may be found elsewhere in the present disclosure (e.g., FIGS. 2, 3, 6-7 and descriptions thereof). In some embodiments, the actuator assembly 405 may be operably coupled to the moveable member 450 via, e.g., a connecting rod (not shown), and driving force(s) (generated by the actuation component 410) may be transmitted (by the transmission component 420) to the moveable member 450 via the connecting rod. That is, the actuator assembly 405 may drive (through the connecting rod) the moveable member 450 to move. In some embodiments, the first wall 430 may be connected to the third wall 4100 and the fourth wall 4110. In some embodiments, the first wall 430 may include a hole, and the connecting rod connecting the transmission component 420 and the moveable member 450 may move through the hole. Alternatively, in some embodiments, the first wall 430 may not be connected to the third wall 4100 and the fourth wall 4110, the first wall 430 may be movable, or the first wall 430 may be omitted.

As shown in FIG. 4A, the moveable member 450 of the microfluidic chip pump 400 may be at a first stable position. In some embodiments, at the first stable position, the moveable member 450 may be closest to the first wall 430. In some embodiments, the moveable member 450 may abut the first wall 430 when in the first stable position. In some embodiments, at the first stable position, the moveable member 450 may fit closely with the first wall 430. In some embodiments, at the first stable position, there may be no space or gap between the moveable member 450 and the first wall 430. When the moveable member 450 is at the first stable position shown in FIG. 4A, the first chamber 440 may have a minimum volume, and accordingly, the second chamber 460 may have a maximum volume. In some embodiments, the minimum volume of the first chamber 440 may be approximately 0, while the maximum volume of the second chamber 460 may be substantially equal to the volume of the pump cavity that includes the first chamber 440 and the second chamber 460.

As shown in FIG. 4B, the moveable member 450 of the microfluidic chip pump 400 may be at a second stable position. It should be noted that the microfluidic chip pump 400 shown in FIG. 4A is the same as the microfluidic chip pump 400 shown in FIG. 4B except that the moveable member 450 is at different stable positions. In some embodiments, at the second stable position, a bottom surface of the moveable member 450 may be aligned with the bottom surfaces of the third wall 4100 and the fourth wall 4110. Alternatively, in some embodiments, the moveable member 450 may abut the second wall 470 when in the second stable position. In some embodiments, at the second stable position, the moveable member 450 may fit closely with the second wall 470. When the moveable member 450 is at the second stable position shown in FIG. 4B, the second chamber 460 may have a minimum volume, and accordingly, the first chamber 440 may have a maximum volume.

It should be noted that the first stable position and the second stable position of the moveable member 450 shown in FIGS. 4A-4B and above descriptions are merely provided for the purposes of illustration, and not intended to limit the scope of the present disclosure. In some embodiments, the moveable member 450 may have more than two stable positions. In some embodiments, the actuator assembly 405 may record a current position of the moveable member 450, and/or drive the moveable member 450 to move to any desired position in the pump cavity. Accordingly, the moveable member 450 may have a plurality of stable positions, and the actuator assembly 405 may drive (or control) the moveable member 450 between different stable positions by adjusting the driving force(s) applied on the moveable member 450 based on a current position of the moveable member 450, and/or a target position of the moveable member 450.

In some embodiments, the inlet valve 480 and/or the outlet valve 490 may be passive valves. When the moveable member 450 is driven between different stable positions, the volume of the first chamber 440 (and/or the second chamber 460) may change, and the fluid pressure in the second chamber 460 may change. With the fluid pressure in the second chamber 460 changes, fluid can be pumped into (or out from) the second chamber 460. More descriptions of the pumping of the fluid via passive valves may be found elsewhere in the present disclosure (e.g., FIGS. 2-3B and descriptions thereof). In some embodiments, the inlet valve 480 and/or the outlet valve 490 may be active valves. When the moveable member 450 is driven between different stable positions, the control assembly 112 may control the open/close state of the inlet valve 480 and/or the outlet valve 490 accordingly, and thus the fluid can be pumped into (or out from) the second chamber 460.

Figure 5:
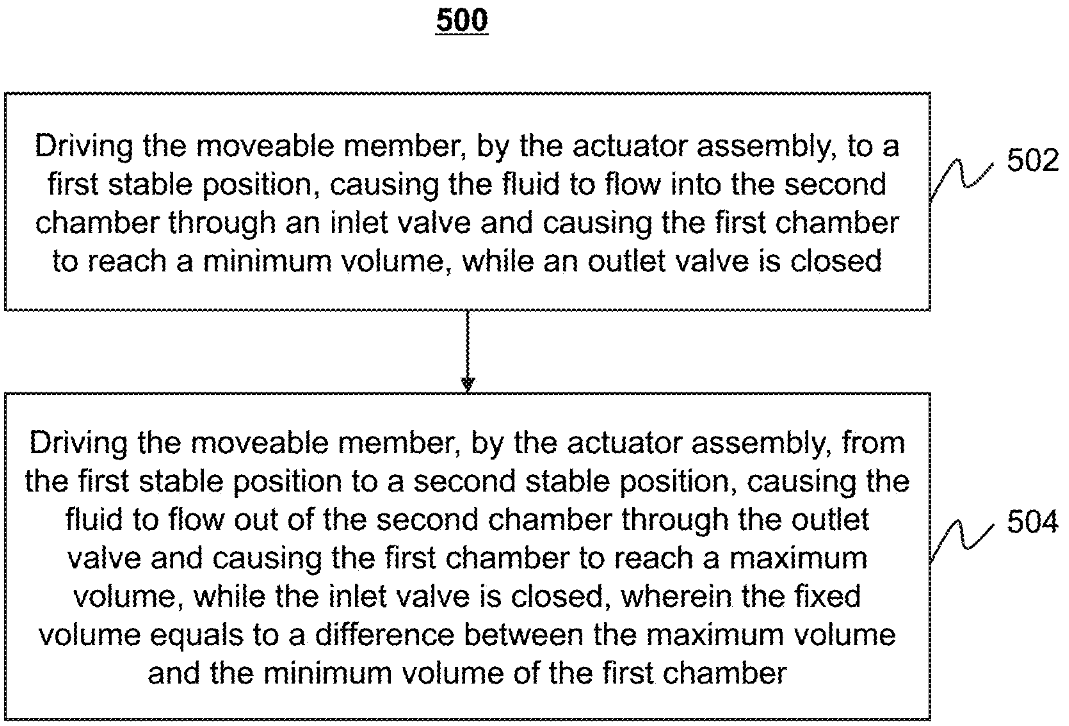
FIG. 5 is a flowchart illustrating an exemplary process for dispensing a fixed volume of a fluid using a microfluidic chip pump according to some embodiments of the present disclosure.

FIG. 5 is a flowchart illustrating an exemplary process for dispensing a fixed volume of a fluid using a microfluidic chip pump (e.g., the microfluidic chip pump 200 in FIG. 2, the microfluidic chip pump 300 in FIG. 3, the microfluidic chip pump 400 in FIG. 4) according to some embodiments of the present disclosure.

In 502, a moveable member (e.g., the moveable member 260, the moveable member 350, the moveable member 450) may be driven to a first stable position (e.g., the first stable position shown in FIGS. 3A and 4A) by an actuator assembly (e.g., the actuator assembly 210, the actuator assembly 305, the actuator assembly 405). A fluid may be caused to flow into a second chamber (e.g., the second chamber 233, the second chamber 360, the second chamber 460) through an inlet valve (e.g., the inlet valve 242, the inlet valve 380, the inlet valve 480), and a first chamber (e.g., the first chamber 231, the first chamber 340, the first chamber 440) may be caused to reach a minimum volume, while an outlet valve (e.g., the outlet valve 252, the outlet valve 390, the outlet valve 490) is closed. More descriptions of the first stable position and the operation of the moveable member to the first stable position may be found elsewhere in the present disclosure (e.g., FIGS. 3A and 4A and descriptions thereof).

In 504, the moveable member may be driven from the first stable position to a second stable position (e.g., the second stable position shown in FIGS. 3B and 4B). The fluid may be caused to flow out of the second chamber through the outlet valve, and the first chamber may be caused to reach a maximum volume, while the inlet valve is closed. In some embodiments, the fixed volume may equal to a difference between the maximum volume and the minimum volume of the first chamber. More descriptions of the second stable position and the operation of the moveable member to the second stable position may be found elsewhere in the present disclosure (e.g., FIGS. 3B and 4B and descriptions thereof).

It should be noted that the above description of the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operations 502 and 504 may be integrated into a single operation. As another example, the moveable member may be driven from the second stable position to a third stable position, causing another fixed volume of fluid to flow out of the second chamber.

Figure 6:
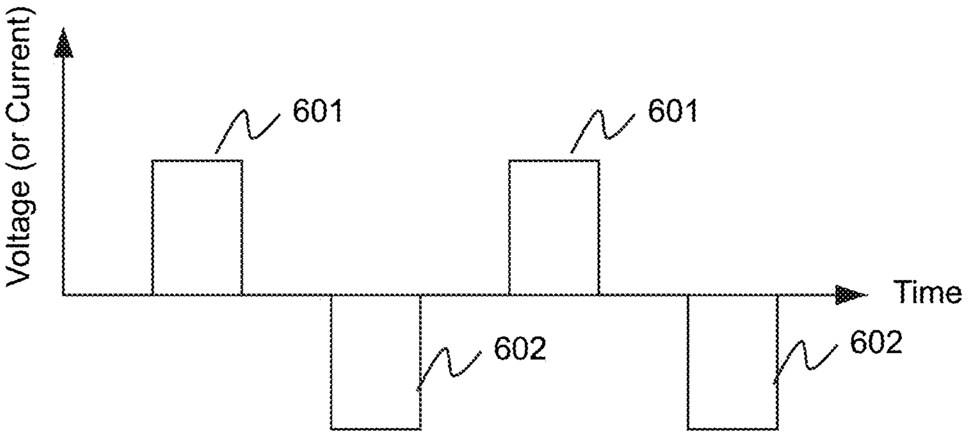
FIG. 6 is a schematic diagram illustrating exemplary control signals according to some embodiments of the present disclosure.

FIG. 6 is a schematic diagram illustrating exemplary control signals according to some embodiments of the present disclosure. In some embodiments, an actuator assembly (e.g., the actuator assembly 305, the actuator assembly 210, the actuator assembly 405) may be controlled by a control circuitry (e.g., the second control circuitry described in FIGS. 3A-3B). The control circuitry may provide one or more control signals to control the actuator assembly to drive a moveable member of a microfluidic chip pump (e.g., the moveable member 350 of the microfluidic chip pump 300, the moveable member 450 of the microfluidic chip pump 400) between different stable positions. In some embodiments, the control circuitry may be disposed in or operably coupled to the microfluidic chip pump. In some embodiments, control signals generated by the control circuitry may include one or more first control signals 601 and one or more second control signals 602. In some embodiments, the first control signal(s) 601 may be configured to control the actuator assembly to drive the moveable member from a second stable position to a first stable position, causing a fluid to flow into the second chamber through an inlet valve. In some embodiments, the second control signal(s) 602 may be configured to control the actuator assembly to drive the moveable member from the first stable position to the second stable position, causing the fluid to flow out of the second chamber through the outlet valve. More descriptions of the first stable position and the second stable position may be found elsewhere in the present disclosure (e.g., FIGS. 3A-4B and descriptions thereof).

In some embodiments, as illustrated in FIG. 6, the first control signal(s) 601 and/or the second control signal(s) 602 may be represented by pulse signals. In some embodiments, pulse signal(s) representing the first control signal(s) 601 and pulse signal(s) representing the second control signal(s) 602 may be in opposite directions. For example, the first control signal(s) 601 may be positive pulse signal(s), while the second control signal(s) 602 may be negative pulse signal(s). In some embodiments, the pulse signal(s) may be configured to drive a movement of the moveable member. For example, one pulse signal may represent one movement of the moveable member. In some embodiments, the pulse signal(s) representing the first control signal(s) 601 and pulse signal(s) representing the second control signal(s) 602 may be in the same direction. In some embodiments, the pulse signal(s) representing the first control signal(s) 601 and pulse signal(s) representing the second control signal(s) 602 may be zero and nonzero, respectively. The control signals shown in FIG. 6 are merely provided for the purposes of illustration, and not intended to limit the scope of the present disclosure. In some embodiments, the first control signal(s) 601 and/or the second control signal(s) 602 may be represented by a square wave, a sine wave, a trapezoidal wave, a triangular wave, etc. In some embodiments, the first control signal(s) 601 and the second control signal(s) 602 may be integrated into or represented by a single control signal. In some embodiments, the single control signal may include one or more rising edges and one or more falling edges. In some embodiments, a rising edge may be configured to drive a movement of the moveable member (e.g., control the actuator assembly to drive the moveable member from the second stable position to the first stable position, or from the first stable position to the second stable position). In some embodiments, a stable level of the single control signal following the rising edge may indicate that the moveable member may maintain in the first stable position (or the second stable position). In some embodiments, a falling edge may be configured to drive another movement of the moveable member (e.g., control the actuator assembly to drive the moveable member from the first stable position to the second stable position, or from the second stable position to the first stable position). In some embodiments, a stable level of the single control signal following the falling edge may indicate that the moveable member may maintain in the second stable position (or the first stable position).

Taking the microfluidic chip pump 300 as an example, if an instruction is sent by a user or operator via a terminal 130 or by the control assembly 112 to the control circuitry, the control circuitry may provide control signals to the actuation component 310. The actuation component 310 may generate one or more driving forces based on the control signals. The transmission component 320 may transmit the driving force(s) to the moveable member 350 and drive the moveable member 350 between the first stable position and the second stable position. If a second control signal is provided, the actuation component 310 and the transmission component 320 may drive the moveable member 350 from the first stable position to the second stable position. If a first control signal 601 is provided, the actuation component 310 and the transmission component 320 may drive the moveable member 350 from the second stable position to the first stable position.

In some embodiments, in response to one first control signal 601 and one following second control signal 602, the microfluidic chip pump may dispense a fixed volume of fluid. If a target volume of fluid needs to be dispensed, a certain number of first control signals and second control signals may be used to control the microfluidic chip pump to dispense the fluid in multiple times. More descriptions of the dispensing of a target volume of fluid may be found elsewhere in the present disclosure (e.g., FIG. 7 and descriptions thereof).

Figure 7:
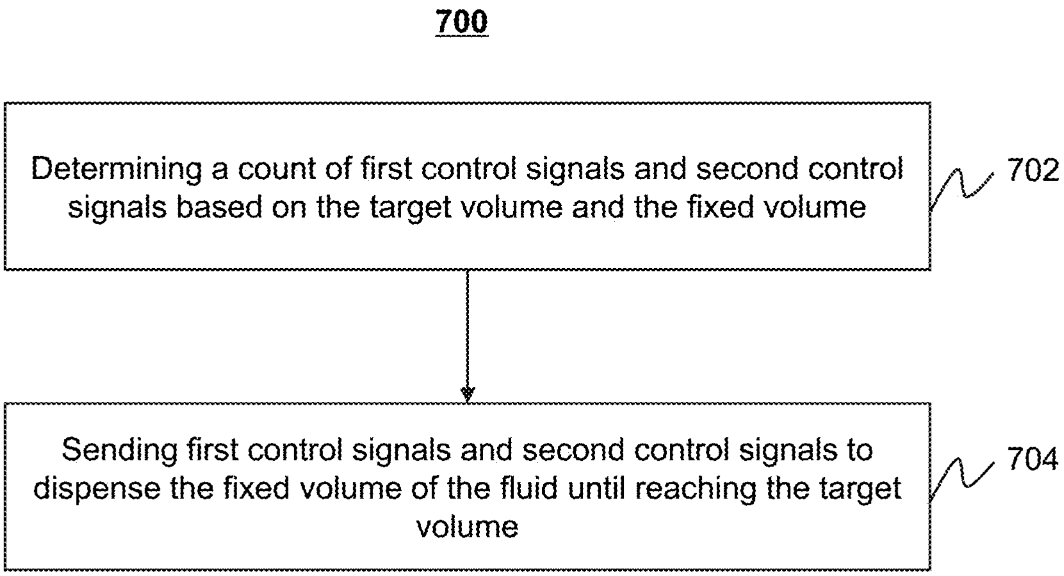
FIG. 7 is a flowchart illustrating an exemplary process for dispensing a target volume of a fluid using a microfluidic chip pump according to some embodiments of the present disclosure.

FIG. 7 is a flowchart illustrating an exemplary process for dispensing a target volume of a fluid using a microfluidic chip pump (e.g., the microfluidic chip pump 200 in FIG. 2, the microfluidic chip pump 300 in FIG. 3, the microfluidic chip pump 400 in FIG. 4) according to some embodiments of the present disclosure. In some embodiments, the process 700 may be executed by the dispensing system 100. For example, the process 700 may be implemented as a set of instructions (e.g., an application) stored in one or more storage devices (e.g., the storage device 150) and invoked and/or executed by the terminal 130. The operations of the process 700 presented below are intended to be illustrative. In some embodiments, the process may be accomplished with one or more additional operations not described, and/or without one or more of the operations discussed. Additionally, the order in which the operations of the process 700 as illustrated in FIG. 7 and described below is not intended to be limiting.

In 702, a count of first control signals and second control signals may be determined based on the target volume and the fixed volume. For example, the count may be determined based on the target volume divided by the fixed volume.

In 704, the first control signals and second control signals may be sent to dispense the fixed volume of the fluid until reaching the target volume. In some embodiments, for each time of dispensing the fixed volume, a first control signal may be sent to an actuator assembly of the microfluidic chip pump to drive the moveable member to a first stable position, causing the fluid to flow into a second chamber through an inlet valve and causing a first chamber to reach a minimum volume, while an outlet valve is closed. In some embodiments, a second control signal may be sent to the actuator assembly to drive the moveable member from the first stable position to a second stable position, causing the fluid to flow out of the second chamber through the outlet valve and causing the first chamber to reach a maximum volume, while the inlet valve is closed. In some embodiments, the fixed volume may equal to a difference between the maximum volume and the minimum volume of the first chamber.

In some embodiments, a frequency (i.e., the times of dispensing the fluid in a unit time) of using the microfluidic chip to dispense the fluid may be determined based on a predetermined volume dispensed in a unit time, a predetermined time period, the fixed volume, and/or the target volume. In some embodiments, the count of first control signals and second control signals may be determined based on the frequency. In some embodiments, a count of first control signals and second control signals sent in a unit time may be determined based on the frequency. For example, if it is designed that the fluid is dispensed twice one hour, then two first control signals and second control signals may be used to control the microfluidic chip pump to dispense the fluid. In some embodiments, the target volume may be adjusted by adjusting the frequency.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. A dispensing system including a microfluidic chip pump and a control assembly, the microfluidic chip pump comprising:

a pump housing comprising a pump cavity, a first wall and a second wall, a moveable member arranged in the pump cavity, separating the pump cavity into a first chamber and a second chamber;

an actuator assembly connected to the pump housing or moveable member, wherein the actuator assembly is configured to drive the moveable member between a first stable position and a second stable position, changing a volume of the first chamber and a volume of the second chamber, the first stable position being a position that a first part of the moveable member abuts a part of the first wall and leaves no space or gap between the first part of the moveable member and the part of the first wall such that the first chamber reaches a minimum volume, the second stable position being a position that a second part of the moveable member abuts a part of the second wall and leaves no gap between the second part of the moveable member and the part of the second wall such that the first chamber reaches a maximum volume, the moveable member being made of an elastic material; the actuator assembly including an actuation component and a transmission component, the actuation component including at least one of: a motor, a piezoelectric actuator, a magnetic actuator, a metal memory component, or a thermal deformation-related component, the transmission component including at least one of: a hydraulic transmission device, a pneumatic transmission device, or a mechanical transmission device;

an inlet valve fluidically connected to the second chamber, the inlet valve being configured to control a flow of fluid into the second chamber;

an outlet valve fluidically connected to the second chamber, the outlet valve being configured to control a flow of fluid out of the second chamber; and the control assembly is configured to provide control signals to the actuator assembly to drive the moveable member between the first stable position and the second stable position, the control signals including: a first control signal to the actuator assembly to drive the moveable member from the second stable position to the first stable position, and a second control signal to the actuator assembly to drive the moveable member from the first stable position to the second stable position;

wherein:

a first surface of the first wall facing the moveable member being an arc-shaped surface, a first surface of the second wall facing the moveable member being an arc-shaped surface;

when the moveable member is driven from the second stable position to the first stable position, the inlet valve is open, and the outlet valve is closed, when the moveable member is driven from the first stable position to the second stable position, the inlet valve is closed, and the outlet valve is open, and the microfluidic chip pump is configured to expel a fixed volume of fluid from the second chamber each time the moveable member is driven from the first stable position to the second stable position, the fixed volume equaling to a difference between the maximum volume of the first chamber and the minimum volume of the first chamber.

2. The dispensing system of claim 1, wherein the fixed volume of fluid expelled from the second chamber is in the range of 0.01 μL-10 mL.

3. The dispensing system of claim 2, wherein the fixed volume of fluid expelled from the second chamber is in the range of 0.1 μL-2 μL.

4. The dispensing system of claim 2, wherein the fixed volume of fluid expelled from the second chamber is 0.5 μL.

5. The dispensing system of claim 1, further comprising:

a fluid reservoir fluidically connected to the inlet valve through a first channel; and an application member fluidically connected to the outlet valve through a second channel.

6. The dispensing system of claim 1, wherein the microfluidic chip pump includes one or more sensors configured to monitor a working status of the microfluidic chip pump.

7. A method of dispensing a fixed volume of a fluid using a dispensing system, which includes a microfluidic chip pump and a control assembly, the microfluidic chip pump including a pump housing comprising a pump cavity, a first wall and a second wall, a moveable member separating the pump cavity into a first chamber and a second chamber, an actuator assembly connected to the pump housing or moveable member, an inlet valve fluidically connected to the second chamber, an outlet valve fluidically connected to the second chamber, and the control assembly being configured to provide control signals to the actuator assembly to drive the moveable member between the first stable position and the second stable position, the control signals including: a first control signal to the actuator assembly to drive the moveable member from the second stable position to the first stable position, and a second control signal to the actuator assembly to drive the moveable member from the first stable position to the second stable position; the method comprising:

driving the moveable member, by the actuator assembly, to a first stable position, causing the fluid to flow into the second chamber through the inlet valve and causing the first chamber to reach a minimum volume, while the outlet valve is closed, wherein the first stable position is a position that a first part of the moveable member abuts a part of the first wall and leaves no space or gap between the first part of the moveable member and the part of the first wall such that the first chamber reaches a minimum volume; and driving the moveable member, by the actuator assembly, from the first stable position to a second stable position, causing the fluid to flow out of the second chamber through the outlet valve and causing the first chamber to reach a maximum volume, while the inlet valve is closed, wherein the fixed volume equals to a difference between the maximum volume and the minimum volume of the first chamber and the second stable position is a position that a second part of the moveable member abuts a part of the second wall and leaves no gap between the second part of the moveable member and the part of the second wall such that the first chamber reaches a maximum volume, the moveable member being made of an elastic material; the actuator assembly including an actuation component and a transmission component, the actuation component including at least one of: a motor, a piezoelectric actuator, a magnetic actuator, a metal memory component, or a thermal deformation-related component, the transmission component including at least one of: a hydraulic transmission device, a pneumatic transmission device, or a mechanical transmission device;

wherein:

the inlet valve is configured to control a flow of fluid into the second chamber;

the outlet valve is configured to control a flow of fluid out of the second chamber;

a first surface of the first wall facing the moveable member is an arc-shaped surface, a first surface of the second wall facing the moveable member is an arc-shaped surface;

when the moveable member is driven from the second stable position to the first stable position, the inlet valve is open, and the outlet valve is closed; and when the moveable member is driven from the first stable position to the second stable position, the inlet valve is closed, and the outlet valve is open.

8. A method of dispensing a target volume of a fluid by dispensing a fixed volume of the fluid one or more times using a dispensing system, which includes a microfluidic chip pump and a control assembly, the microfluidic chip pump including a pump housing comprising a pump cavity, a first wall and a second wall, a moveable member separating the pump cavity into a first chamber and a second chamber, an actuator assembly connected to the pump housing or moveable member, an inlet valve fluidically connected to the second chamber, an outlet valve fluidically connected to the second chamber, and the control assembly being configured to provide control signals to the actuator assembly to drive the moveable member between the first stable position and the second stable position, the control signals including: a first control signal to the actuator assembly to drive the moveable member from the second stable position to the first stable position, and a second control signal to the actuator assembly to drive the moveable member from the first stable position to the second stable position; the method comprising:

determining a count of first control signals and second control signals based on the target volume and the fixed volume by the control assembly, sending, from the control assembly, first control signals and second control signals to the microfluidic chip pump, and dispensing, by the microfluidic chip pump, based on the first control signals and the second control signals, the fixed volume of the fluid from the first chamber to the second chamber until reaching the target volume, wherein:

for dispensing the fixed volume, the method comprises:

sending, from the control assembly, a first control signal to the actuator assembly to drive the moveable member to a first stable position, causing the fluid to flow into the second chamber through the inlet valve and causing the first chamber to reach a minimum volume, while the outlet valve is closed, wherein the first stable position is a position that a first part of the moveable member abuts a part of the first wall and leaves no space or gap between the first part of the moveable member and the part of the first wall such that the first chamber reaches a minimum volume; and sending, from the control assembly, a second control signal to the actuator assembly to drive the moveable member from the first stable position to a second stable position, causing the fluid to flow out of the second chamber through the outlet valve and causing the first chamber to reach a maximum volume, while the inlet valve is closed, wherein the fixed volume equals to a difference between the maximum volume and the minimum volume of the first chamber and the second stable position is a position that a second part of the moveable member abuts a part of the second wall and leaves no space or gap between the second part of the moveable member and the part of the second wall such that the first chamber reaches a maximum volume, the moveable member being made of an elastic material; the actuator assembly including an actuation component and a transmission component, the actuation component including at least one of: a motor, a piezoelectric actuator, a magnetic actuator, a metal memory component, or a thermal deformation-related component, the transmission component including at least one of: a hydraulic transmission device, a pneumatic transmission device, or a mechanical transmission device;

wherein:

the inlet valve is configured to control a flow of fluid into the second chamber;

the outlet valve is configured to control a flow of fluid out of the second chamber;

a first surface of the first wall facing the moveable member is an arc-shaped surface, a first surface of the second wall facing the moveable member is an arc-shaped surface;

when the moveable member is driven from the second stable position to the first stable position, the inlet valve is open, and the outlet valve is closed; and when the moveable member is driven from the first stable position to the second stable position, the inlet valve is closed, and the outlet valve is open.

9. The method of claim 8, wherein the determining a count of first control signals and second control signals based on the target volume and the fixed volume by the control assembly includes:

determining a frequency of using the microfluidic chip pump to dispense the fluid based on a predetermined volume in a unit time or a predetermined time period, and the fixed volume; and determining the count of first control signals and second control signals based on the frequency of using the microfluidic chip pump.

10. The method of claim 9, further comprising:

adjusting the target volume by adjusting the frequency of using the microfluidic chip pump.

* * * * *